United States Patent [19]

Kato et al.

[11] Patent Number: 5,112,718
[45] Date of Patent: May 12, 1992

[54] LIQUID DEVELOPER FOR ELECTROSTATIC PHOTOGRAPHY

[75] Inventors: Eiichi Kato; Hideyuki Hattori, both of Shizuoka, Japan

[73] Assignee: Fuji Photo Film Co., Ltd., Kanagawa, Japan

[21] Appl. No.: 535,674

[22] Filed: Jun. 11, 1990

[30] Foreign Application Priority Data

Jun. 12, 1989 [JP] Japan .................. 1-146671
Sep. 27, 1989 [JP] Japan .................. 1-249095
Sep. 28, 1989 [JP] Japan .................. 1-250580

[51] Int. Cl.$^5$ .............................................. G03G 9/13
[52] U.S. Cl. ................................... 430/114; 430/115; 430/904
[58] Field of Search .................. 430/114, 904, 115

[56] References Cited

U.S. PATENT DOCUMENTS

| | | | |
|---|---|---|---|
| 4,360,580 | 11/1982 | Tsubuko et al. | 430/114 |
| 4,618,557 | 10/1986 | Dan et al. | 430/114 |
| 4,636,452 | 1/1987 | Furukawa et al. | 430/114 |
| 4,665,002 | 5/1987 | Dan et al. | 430/904 |
| 4,837,102 | 6/1989 | Dan et al. | 430/114 |
| 4,983,486 | 1/1991 | Kato et al. | 430/904 |
| 5,006,441 | 4/1991 | Kato | 430/114 |
| 5,035,971 | 8/1991 | Kato et al. | |
| 5,043,241 | 7/1991 | Kato et al. | |

Primary Examiner—Marion E. McCamish
Assistant Examiner—Christopher D. RoDee
Attorney, Agent, or Firm—Sughrue, Mion, Zinn, Macpeak & Seas

[57] ABSTRACT

A liquid developer for electrostatic photography is disclosed. The liquid developer comprises resin grains dispersed in a non-aqueous solvent having an electric resistance of at least $10^9$ Ω cm and a dielectric constant of not higher than 3.5, wherein the dispersed resin grains are polymer resin grains obtained by polymerizing a solution containing at least one kind of a mono-functional monomer (A) which is soluble in the non-aqueous solvent but becomes insoluble in the non-aqueous solvent by being polymerized, in the presence of a dispersion-stabilizing resin which is soluble in the non-aqueous solvent and is a comb-like copolymer comprising (1) at least a mono-functional macromonomer (M) having a weight average molecular weight of from $1 \times 10^3$ to $2 \times 10^4$ and (2) at least a monomer represented by formula (III) as defined in the specification.

The liquid developer according to the present invention is excellent in re-dispersibility, storability, stability, image-reproducibility, and fixability.

7 Claims, No Drawings

LIQUID DEVELOPER FOR ELECTROSTATIC PHOTOGRAPHY

FIELD OF THE INVENTION

This invention relates to a liquid developer for electrostatic photography, which comprises resin grains dispersed in a liquid carrier having an electric resistance of at least $10^9$ Ω cm and a dielectric constant of not higher than 3.5, and more particularly to an Electrostatic photography liquid developer excellent in re-dispersibility, storability, stability, image-reproducibility, and fixability.

BACKGROUND OF THE INVENTION

In general, a liquid developer for electrostatic photography (electrophotography) is prepared by dispersing an inorganic or organic pigment or dye such as carbon black, nigrosine, phthalocyanine blue, etc., a natural or synthetic resin such as an alkyd resin, an acrylic resin, rosine, synthetic rubber, etc., in a liquid having a high electric insulating property and a low dielectric constant, such as a petroleum aliphatic hydrocarbon, etc., and further adding a polarity-controlling agent such as a metal soap, lecithin, linseed oil, a higher fatty acid, a vinyl pyrrolidone-containing polymer, etc., to the resulting dispersion.

In such a developer, the resin is dispersed in the form of insoluble latex grains having a grain size of from several nm to several hundred nm. In a coventional liquid developer, however, the soluble dispersion-stabilizing resin and the polarity-controlling agent are insufficiently bonded to the insoluble latex grains, so that the soluble dispersion-stabilizing resin and the polarity-controlling agent become freely dispersed in the liquid carrier with ease. Accordingly, there is a fault that when the liquid developer is stored for a long period of time or repeatedly used, the dispersion-stabilizing resin is split off from the insoluble latex grains, thereby the latex grains are precipitated, aggregated, and accumulated to make the polarity thereof indistinct. Also, since the latex grains once aggregated or accumulated are reluctant to re-disperse, the latex grains remain everywhere in the developing machine attached thereto, which results in causing stains of images formed and malfunction of the developing machine, such as clogging of a liquid feed pump, etc.

In order to overcome such defects, a means of chemically bonding the soluble dispersion-stabilizing resin and the insoluble latex grains is disclosed in U.S. Pat. No. 3,990,980. However, the liquid developer disclosed therein is still insufficient although the dispersion stability of the grains to the spontaneous precipitation may be improved to some extent. When the liquid developer disclosed in U.S. Pat. No. 3,990,980 is actually used in a developing apparatus, these are some defects that the toner attached to parts of the developing apparatus is solidified in the form of coating and the toner grains thus solidified are reluctant to re-disperse and are insufficient in re-dispersion stability for practical use, which causes the malfunction of the apparatus and staining of duplicated images.

In the method of producing resin grains described in aforesaid U.S. Pat. No. 3,990,980, there is a very severe restriction in the combination of a dispersion stabilizer being used and monomer(s) being insolubilized for producing monodispersed latex grains having a narrow grain size distribution. Mostly, the resin grains produced by the aforesaid method are grains of a broad grain size distribution containing a large amount of coarse grains or poly-dispersed grains having two or more different mean grain sizes. In the aforesaid method, it is difficult to obtain mono-dispersed resin grains having a narrow grain size distribution and having a desired grain size, and the method often results in forming large grains having a mean grain size of 1 μm or larger or very fine grains having a mean grain size of 0.1 μm or less. Furthermore, there is also a problem that the dispersion stabilizer being used must be prepared by an extremely complicated process requiring a long reaction time.

Furthermore, for overcoming the aforesaid defects, a method of improving the dispersibility, re-dispersibility and storage stability of resin grains by forming insoluble dispersed resin grains by polymerizing a monomer being insolubilized in the presence of a polymer utilizing a di-functional monomer or a polymer utilizing a macromolecular reaction is disclosed in JP-A-60-185962 and JP-A-61-43757 (the term "JP-A" as used herein means an "unexamined published Japanese patent application").

On the other hand, a noticiable progress has recently been made in shortening the operation time in an electrophotomechanical system and an improvement of quickening a development-fixing steps in the system has been made.

Also, the rationalization of an electrophotomechanical system has been greatly required and, practically, it has been attempted to prolong the maintenance time of a printing plate making machine. In the attempt, a liquid developer which can be used for a long period of time without being renewed has been required.

The dispersed resin grains produced by the methods disclosed in aforesaid JP-A-60-17951 and JP-A-62-151868 yet show an unsatisfactory performance with respect to the dispersibility and re-dispersibility of the resin grains in the case of increasing the development speed.

SUMMARY OF THE INVENTION

This invention has been made for solving the aforesaid problems inherent to conventional electrophotographic liquid developers.

An object of this invention is to provide a liquid developer excellent in dispersion stability, re-dispersibility, and fixing property in an electrophotomechanical system wherein the development-fix steps are quickened and the maintenance time thereof is prolonged.

Another object of this invention is to provide a liquid developer capable of forming an offset printing master plate having excellent receptivity for printing ink and printing durability by electrophotography.

A further object of this invention is to provide a liquid developer suitable for various electrostatic photographies and various transfer systems in addition to the aforesaid uses.

A still further object of this invention is to provide a liquid developer capable of being used for any liquid developer-using systems such as ink jet recording, cathoderay tube recording, and recording by pressure variation or electrostatic variation.

The above and other objects have been attained by the present invention as set forth hereinbelow.

That is, according to this invention, there is provided a liquid developer for electrostatic photography comprising at least resin grains dispersed in a non-aqueous solvent having an electric resistance of at least $10^9 \Omega$ cm and a dielectric constant of not higher than 3.5, wherein the dispersed resin grains are polymer resin grains obtained by polymerizing a solution containing at least one kind of a monofunctional monomer (A) which is soluble in the above non-aqueous solvent but becomes insoluble in the above non-aqueous solvent by being polymerized, in the presence of a dispersion-stabilizing resin which is soluble in the aforesaid non-aqueous solvent and is a comb-like copolymer formed from (1) at least a monofunctional macromonomer (M) having a weight average molecular weight of from $1 \times 10^3$ to $2 \times 10^4$ and (2) at least a monomer represented by following formula (III), the mono-functional macromonomer (M) having a polymerizable double bond group represented by the following formula (I) bonded to only one terminal of a polymer main chain containing at least one kind of a polymer component represented by the following formula (IIa) or (IIb);

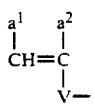
(I)

wherein V represents —COO—, —OCO—, $CH_2$ $_mOCO$—, $CH_2$ $_mCOO$—, —O—, —CONHCOO—, —CONHCO, —SO$_2$—, —CO—,

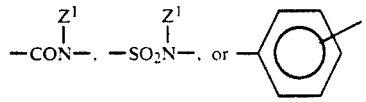

(wherein $Z^1$ represents a hydrogen atom or a hydrocarbon group having from 1 to 22 carbon atoms, and m represents an integer of from 1 to 3); $a^1$ and $a^2$, which may be the same or different, each represents hydrogen atom a halogen atom, a cyano group, a hydrocarbon group having from 1 to 22 carbon atoms, —COO—$Z^2$, or —COO—$Z^2$ bonded via a hydrocarbon group having from 1 to 22 carbon atoms (wherein $Z^2$ represents a hydrogen atom or a hydrocarbon group having from 1 to 22 carbon atoms which may be substituted);

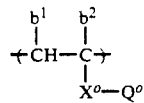
(IIa)

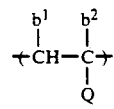
(IIb)

wherein $X^o$ has the same meaning as V; $Q^o$ represents an aliphatic group having from 1 to 22 carbon atoms or an aromatic group having from 6 to 12 carbon atoms; Q represents —CN or

wherein Y represents a hydrogen atom, a halogen atom, an alkoxy group, or —COO$Z^3$ (wherein $Z^3$ represents an alkyl group having from 1 to 32 carbon atoms, an aralkyl group having from 7 to 22 carbon atoms, or an aryl group having from 6 to 22 carbon atoms); and $b^1$ and $b^2$, which may be the same or different, have the same meaning as $a^1$ and $a^2$ in formula (I);

(III)

wherein $X^1$ has the same meaning as $X^o$ in formula (IIa); $Q^1$ has the same meaning as $Q^o$ in formula (IIa); and $d^1$ and $d^2$, which may be the same or different have the same meaning as $a^1$ and $a^2$ in formula (I); provided that, in the component of the macromonomer (M) represented by formula (IIa) and in the component of the monomer represented by formula (III), at least one of $Q^o$ and $Q^1$ represents an aliphatic group having from 10 to 22 carbon atoms.

It is preferred that the dispersion-stabilizing resin for use in this invention is a comb-like copolymer having a weight average molecular weight of from $2 \times 10^4$ to $2 \times 10^5$ and having a polar group selected from —PO$_3$H$_2$, —SO$_3$H, —COOH, —OH, —SH,

(wherein $Z^o$ represents —$Z^{10}$ or —O$Z^{10}$ (wherein $Z^{10}$ represents a hydrocarbon group)), a formyl group and an amino group bonded to only one terminal of the polymer main chain.

DETAILED DESCRIPTION OF THE INVENTION

Then, the liquid developer for electrostatic photography of this invention is described hereinafter in detail.

As the liquid carrier for the liquid developer of this invention having an electric resistance of at least $10^9 \Omega$ cm and a dielectric constant of not higher than 3.5, straight chain or branched aliphatic hydrocarbons, alicyclic hydrocarbons, aromatic hydrocarbons, and halogen-substituted compounds thereof can be preferably used. Specific examples of liquid carriers include octane, isooctane, decane, isodecane, decalin, nonane, dodecane, isododecane, cyclohexane, cyclooctane, cyclodecane, benzene, toluene, xylene, mesitylene, Isopar E, Isopar G, Isopar H, Isopar L (Isopar: trade name of Exxon Co.), Shellsol 70, Shellsol 71 (Shellsol: trade name of Shell Oil Co.), Amsco OMS and Amsco 460 solvent (Amsco: trade name of American Mineral Spirits Co.).

They may be used singly or as a combination thereof.

The non-aqueous dispersed resin grains (hereinafter, often referred to as "dispersion resin grains" or "latex grains") which are the most important constituting element in this invention are resin grains produced by polymerizing (so-called polymerization granulation method) the aforesaid mono-functional monomer (A) in a non-aqueous solvent in the presence of the dispersion-stabilizing resin which is the aforesaid comb-like copolymer.

As the non-aqueous solvent in the aforesaid polymerization, any solvents which are miscible with the aforesaid liquid carrier for the liquid developer for electrostatic photography of this invention can be basically used.

That is, the non-aqueous solvent used for the production of the dispersion resin grains can be any solvents which are miscible with the aforesaid liquid carrier for the liquid developer, and such solvents preferably include straight chain or branched chain aliphatic hydrocarbons, alicyclic hydrocarbons, aromatic hydrocarbons, and halogen-substituted compounds thereof. Specific examples of such solvents are hexane, octane, isooctane, decane, isodecane, decalin, nonane, isododecane, Isopar E, Isopar G, Isopar H, Isopar L, Shellsol 70, Shellsol 71, Amsco OMS, and Amsco 460. These solvents may be used alone or as a mixture thereof.

Other organic solvent(s) can be used, if desired, together with the aforesaid non-aqueous solvent for the production of the dispersion resin grains and examples thereof include alcohols (e.g., methanol, ethanol, propyl alcohol, butyl alcohol, and fluorinated alcohols), ketones (e.g., acetone, methyl ethyl ketone, and cyclohexane), carboxylic acid esters (e.g., methyl acetate, ethyl acetate, propyl acetate, butyl acetate, methyl propionate and ethyl propionate), ethers (e.g., diethyl ether, dipropyl ether, tetrahydrofuran, and dioxane), and halogenated hydrocarbons (e.g., methylene dichloride, chloroform, carbon tertachloride, dichloroethane, and methyl chloroform).

It is preferred that the non-aqueous solvent(s) which are used as a mixture with the aforesaid non-aqueous solvent are distilled off by heating or under reduced pressure after the polymerization granulation is completed. However, even when such a solvent is brought in the liquid developer as a latex grain dispersion, the existence of the solvent gives no problem as long as the liquid electric resistance of the liquid developer containing the solvent satisfies the condition that the electric resistance of the solvent is at least $10^9 \Omega$ cm.

In general, it is preferred that the same solvent as the liquid carrier for the liquid developer is used in the step of forming the resin grain dispersion and, such solvents include the straight chain or branched aliphatic hydrocarbons, alicyclic hydrocarbons, aromatic hydrocarbons, halogenated hydrocarbons, etc., as described above.

The dispersion-stabilizing resin for use in this invention is a comb-like copolymer obtained by polymerizing a solution containing at least the monofunctional macromonomer (M) and the monomer shown by formula (III) described above and has a feature that the copolymer is soluble in the aforesaid non-aqueous solvent. It is preferred in this invention that the aforesaid comb-like copolymer has the specific polar group as described above bonded to one terminal of the polymer main chain of the comb-like copolymer.

The weight average molecular weight of the comb-like copolymer is suitably from $2 \times 10^4$ to $2 \times 10^5$, and preferably from $3 \times 10^4$ to $1 \times 10^5$. If the weight average molecular weight thereof is less than $2 \times 10^4$ or more than $2 \times 10^5$, the average grain size of the resin grains obtained by the polymerization granulation becomes coarse or the distribution of the grain sizes become broad to reduce the dispersibility of the resin grains or to cause, sometimes, the aggregation of the resin grains.

The proportion of the mono-functional macromonomer (M) as a copolymer component of the comb-like copolymer is from 1% by weight to 70% by weight, and preferably from 5% by weight to 50% by weight based on the weight of the copolymer. If the proportion thereof is less than 1% by weight, the number of comb portions is greatly reduced to form a chemical structure as a conventional random copolymer, whereby the improvement of the re-dispersibility contemplated in the present invention is not obtained. On the other hand, if the proportion exceeds 70% by weight, the copolymerization with the monomer shown by formula (III) becomes insufficient. Also, the content of the monomer shown by formula (III) existing in the aforesaid comb-like copolymer as other copolymer component is from 30% by weight to 99% by weight, and preferably from 50% by weight to 95% by weight.

On the other hand, the weight average molecular weight of the macromonomer (M) which forms the comb portion of the comb-like copolymer in this invention is from $1 \times 10^3$ to $2 \times 10^4$, and preferably from $2 \times 10^3$ to $1 \times 10^4$. If the weight average molecular weight thereof is less than $1 \times 10^3$, the re-dispersibility of the dispersion resin grains obtained is lowered. On the other hand, if the weight average molecular weight exceeds $2 \times 10^4$, the copolymerizing property with the monomer shown by formula (III) is generally lowered, whereby a comb-like copolymer is not formed.

Since the comb-like copolymer in this invention is required to be soluble in the aforesaid non-aqueous solvent, the copolymer must contain solubilizing recurring unit(s) at the polymer chain portion and/or the comb portion thereof. For this purpose, at least one of $Q^o$ and $Q^1$ in the component of macromonomer (M) represented by formulae (IIa) and in the component of the monomer represented by formula (III), respectively, must be an aliphatic group having from 10 to 22 carbon atoms as described before as one of the features of the present invention.

That is, when the macromonomer (M) constituting the comb portion of the comb-like copolymer contains the recurring unit shown by formula (IIa) and $Q^c$ in formula (IIa) is an aliphatic group having less than 10 carbon atoms or an aromatic group, or, when the macromonomer (M) contains the recurring unit shown by formula (IIb), $Q^1$ in formula (III) constituting the main chain portion of polymer represents an aliphatic group having from 10 to 22 carbon atoms. Also, when $Q^1$ in formula (III) is an aliphatic group having less than 10 carbon atoms or an aromatic group, the macromonomer (M) being combined with the monomer shown by the formula (III) contains at least the recurring unit shown by formula (IIa) wherein $Q^o$ is an aliphatic group having from 10 to 22 carbon atoms.

Then, the comb-like copolymer for use in this invention is described hereinafter in more detail.

The mono-functional macromonomer (M) is a macromonomer having a weight average molecular weight of from $1 \times 10^3$ to $2 \times 10^4$ and comprising the recurring unit shown by formula (IIa) or (IIb) having the polymerizable double bond group shown by formula (I) copolymerizable with the monomer shown by (III), and the polymerizable double bond group is bonded to only one terminal of the main chain of the polymer composed of the aforesaid recurring unit.

In formulae (I), (IIa), and (IIb) described above, the hydrocarbon groups shown by $a^1$, $a^2$, V, $b^1$, $b^2$, $X^o$, $Q^o$, and Q each has the carbon atom number indicated above (as an unsubstituted hydrocarbon group) and each hydrocarbon group may be substituted.

In formula (I), $Z^1$ in the groups (substituents) shown by V represents a hydrogen atom or a hydrocarbon group, and preferred examples of the hydrocarbon group include an alkyl group having from 1 to 22 carbon atoms, which may be substituted (e.g., methyl, ethyl, propyl, butyl, heptyl, hexyl, octyl, decyl, dodeyyl, tridecyl, tetradecyl, hexadecyl, octadecyl, 2-chloroethyl, 2-bromoethyl, 2-cyanoethyl, 2-methoxycarbonylethyl, 2-methoxyethyl, and 3-bromopropyl), an alkenyl group having from 4 to 18 carbon atoms, which may be substituted (e.g., 2-methyl-1-propenyl, 2-butenyl, 2-pentenyl, 3-methyl-2-pentenyl, 1 pentenyl, 1-hexenyl, 2-hexenyl, and 4-methyl-2-hexenyl), an aralkyl group having from 7 to 12 carbon atoms, which may be substituted (e.g., benzyl, phenethyl, 3-phenylpropyl, naphthylmethyl, 2-naphthylethyl, chlorobenzyl, bromobenzyl, methylbenzyl, ethylbenzyl, methoxybenzyl, dimethylbenzyl, and dimethoxybenzyl), an aliphatic group having from 5 to 8 carbon atoms, which may be substituted (e.g., cyclohexyl, 2-cyclohexylethyl, and 2-cyclopentylethyl), and an aromatic group having from 6 to 12 carbon atoms, which may be substituted (e.g., phenyl, naphthyl, tolyl, xylyl, propylphenyl, butylphenyl, octylphenyl, dodecylphenyl, methoxyphenyl, ethoxyphenyl, butoxyphenyl, decyloxyphenyl, chlorophenyl, dichlorophenyl, bromophenyl, cyanophenyl, acetylphenyl, methoxycarbonylphenyl, ethoxycarbonylphenyl, butoxycarbonylphenyl, acetamidophenyl, propioamidophenyl, and dodecyloylamidophenyl).

When V in formula (I) represents

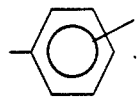

the benzene ring may have a substituent such as a halogen atom (e.g., chlorine and bromine), an alkyl group (e.g., methyl, ethyl, propyl, butyl, chloromethyl, and methoxymethyl), etc.

In formula (I), $a^1$ and $a^2$, which may be the same or different, each represents preferably a hydrogen atom, a halogen atom (e.g., chlorine and bromine), a cyano group, an alkyl group having from 1 to 3 carbon atoms (e.g., methyl, ethyl, and propyl), $-COO-Z^2$ or $-CH_2COOZ^2$ (wherein $Z^2$ represents preferably a hydrogen atom, an alkyl group having from 1 to 18 carbon atoms, an alkenyl group, an aralkyl group, an alicyclic group, or an aryl group, each group may be substituted, and specific examples of $Z^2$ are the same as those described above for $Z^1$).

In formulae (IIa) and (IIb), $X^o$ has the same meaning as V in formula (I), and $b^1$ and $b^2$, which may be the same or different, have the same meaning as $a^1$ and $a^2$ in formula (I).

$Q^o$ in formula (IIa) represents preferably an aliphatic group having from 1 to 22 carbon atoms and specific examples thereof are the same as the alkyl groups described above for $Z^1$.

When Y included in Q in formula (IIa) is an alkoxy group, specific examples of the alkyl moiety thereof are the same as those in $Q^o$ described above.

The preferred embodiments of $X^o$, $b^1$, and $b^2$, are the same as those described above on V, $a^1$ and $a^2$.

It is more preferred that one of $a^1$ and $a^2$ in formula (I) or one of $b^1$ and $b^2$ in formula (IIa) or (IIb) is a hydrogen atom.

The recurring unit of the macromonomer (M) in this invention includes at least one kind of the recurring unit shown by formula (IIa) or (IIb) and specific examples thereof are illustrated below although the present invention is not limited thereto.

In the following formulae, $Q^o$ represents $-C_pH_{2p+1}$ (wherein p represents an integer of from 1 to 18) or

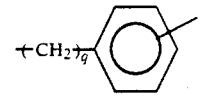

(wherein q represents an integer of from 1 to 4); b represents $-H$ or $-CH_3$; l represents an integer of from 2 to 12; and $R_1$ represents $-H$ or $-C_rH_{2r+1}$ (wherein r represents an integer of from 1 to 8).

(A)-1

(A)-2

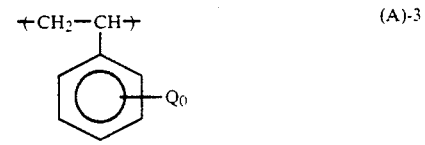
(A)-3

(A)-4

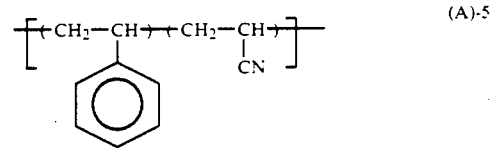
(A)-5

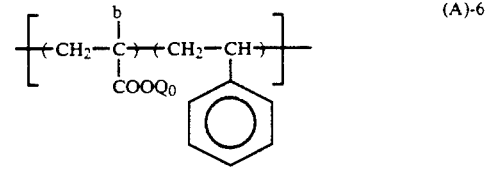
(A)-6

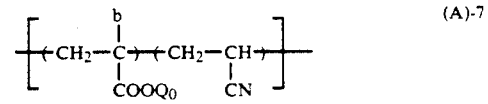
(A)-7

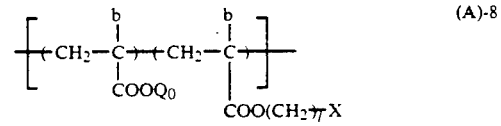
(A)-8

X: $-OH$, $-OR_2(R_2: -C_rH_{2r-1})$, $-F$, $-Cl$, $Br$, or $-CN$

-continued

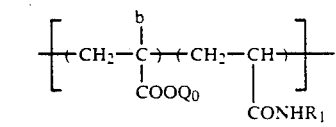
(A)-9

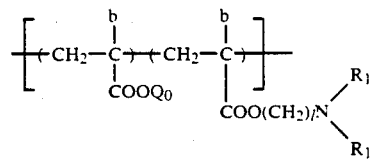
(A)-10

The macromonomer (M) which is used in this invention has a chemical structure that the polymerizable double bond group shown by formula (I) is bonded directly or by an optional linkage group to only one terminal of the polymer main chain composed of at least one kind of the recurring unit shown by formula (IIa) or (IIb) as described above.

The linkage group of linking the component shown by formula (I) to the component shown by formula (IIa) or (IIb) is composed of an optional combination of an atomic group such as carbon-carbon bond (single bond or double bond), a carbon-hetero-atom bond (examples of the hetero atom are oxygen, sulfur, nitrogen, and silicon), and a hetero atom-hetero atom bond.

Preferred examples of the macromonomer (M) in this invention are shown by formula (IV):

$$\begin{array}{c} a^1 \ a^2 \\ | \ | \\ CH=C \quad b^1 \ b^2 \\ | \quad | \ | \\ V-W^1-CH-C- \\ | \\ T \end{array} \quad (IV)$$

wherein $a^1$, $a^2$, $b^1$, $b^2$, and V have the same meanings as those described above in formulae (I), (IIa) and (IIb).

T represents $-X^\circ-Q^\circ$ in formula (IIa) or $-Q$ in formula (IIb) and has the same meaning as described above in formulae (IIa) and (IIb).

In formula (IV), $W^1$ represents a single bond or a single linkage group selected from the atomic groups of

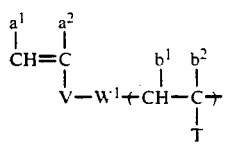

(wherein $Z^4$ and $Z^5$ each represents a hydrogen atom, a halogen atom (e.g., fluorine, chlorine, and bromine), a cyano group, a hydroxy group),

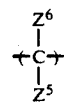, 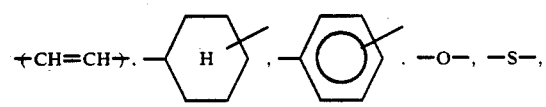

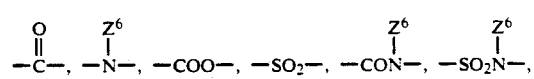

(wherein $Z^6$ and $Z^7$ each represents a hydrogen atom or the same hydrocarbon group as $Z^1$ described above) or a linkage group composed of an optional combination of the aforesaid atomic groups.

Particularly preferred examples of $X^\circ$, Y, V, $a^1$, $a^2$, $b^1$, and $b^2$ in aforesaid formulae (I), (IIa), (IIb) and (IV) are shown below.

That is, $X^\circ$ is preferably $-COO-$, $-OCO-$, $-O-$, $-CH_2COO-$ or $-CH_2OCO-$; Y is preferably an alkyl or alkenyl group having not more than 18 carbon atoms; V represents any of the above described groups ($Z^1$ is however, a hydrogen atom); and $a^1$, $a^2$, $b^1$, and $b^2$ are preferably a hydrogen atom or a methyl group.

Specific examples of the group shown by

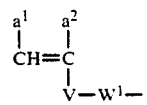

in formula (IV) are illustrated below but the scope of this invention is not limited thereto.

In the following formulae, $m_1$ represents an integer of from 1 to 12; $n_1$ represents an integer of from 2 to 12; and a represents H or $-CH_3$.

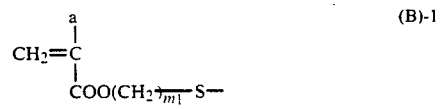
(B)-1

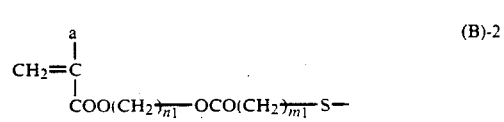
(B)-2

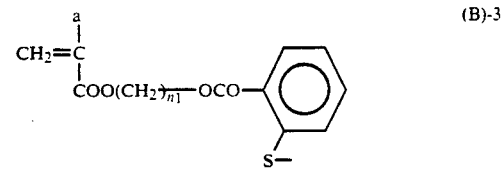
(B)-3

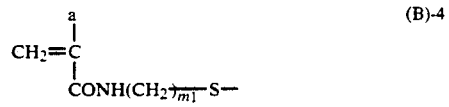
(B)-4

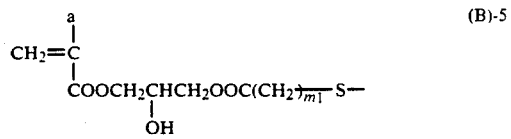
(B)-5

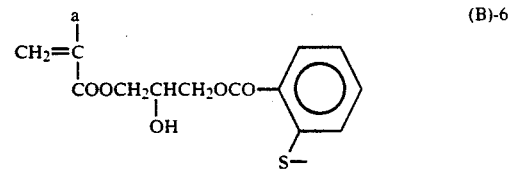
(B)-6

-continued
(B)-7 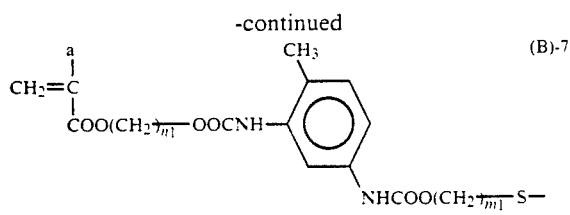
(B)-8 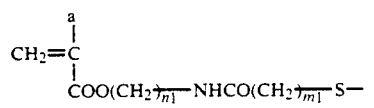
(B)-9 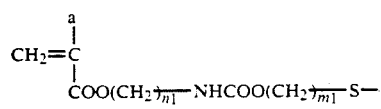
(B)-10 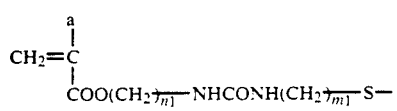
(B)-11 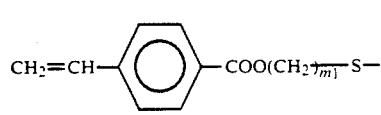
(B)-12 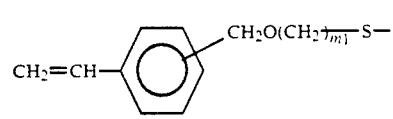
(B)-13 
(B)-14 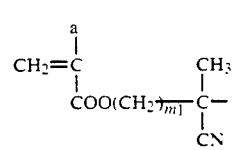
(B)-15 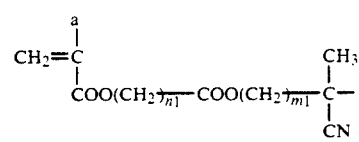
(B)-16 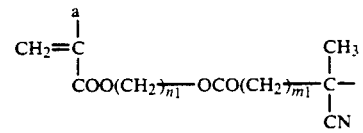
(B)-17 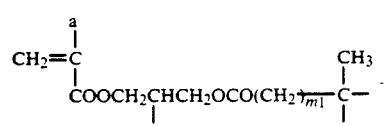
(B)-18 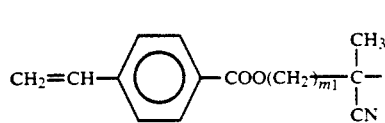
-continued
(B)-19 
(B)-20
(B)-21 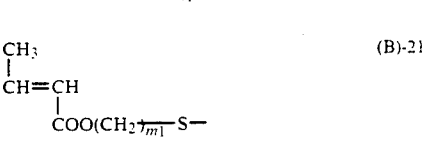
(B)-22 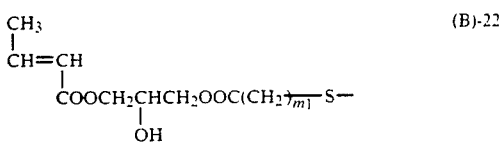
(B)-23 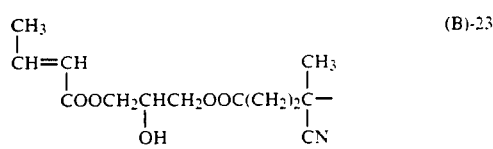
(B)-24 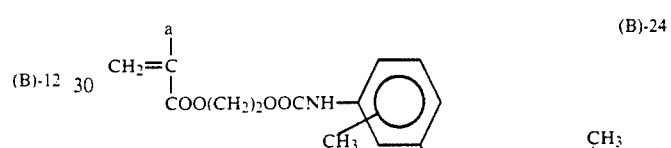
(B)-25 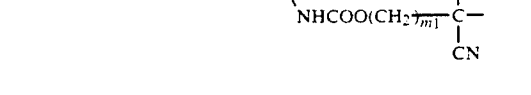
(B)-26 
(B)-27 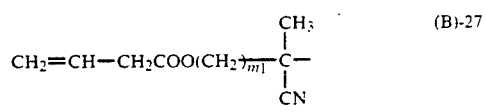
(B)-28 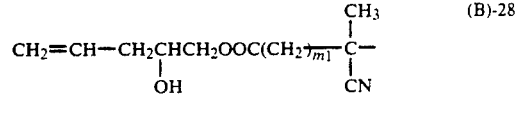
(B)-29 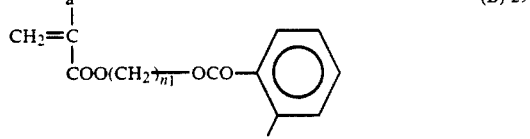
(B)-30 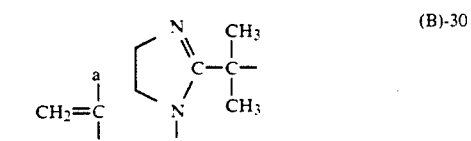

-continued

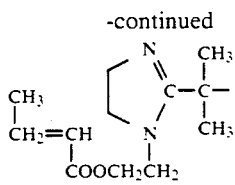
(B)-31

The macromonomer (M) used in this invention can be produced by conventionally known synthesis method.

For example, there are (1) a method by an ion polymerization method of obtaining the macromonomer by reacting various reagents to the terminal of a living polymer obtained by an anion polymerization or a cation polymerization, (2) a method by a radical polymerization of obtaining the macromonomer by reacting various reagents to an oligomer obtained by a radical polymerization using a polymerization initiator and/or a chain transfer agent each having the reactive group such as a carboxy group, a hydroxy group, or an amino group in the molecule, and (3) a method by a polyaddition condensation method of introducing a polymerizable double bond group into an oligomer in the same manner as the aforesaid radical polymerization method, said oligomer being obtained by a polyaddition method or a polycondensation method.

These methods are practically described in P. Dreyfuss & R. P. Quirk, *Encycl. Poly. Sci. Eng.*, 7, 551(1987), P. F. Rempp & E, Franta, *Adv. Polym. Sci.*, 58, 1(1984), V. Percec, *Appl. Poly. Sci.*, 285, 95(1984), R. Asami & M. Takaki, *Makromol. Chem. Suppl.*, 12, 163(1985), P. Rempp et al, *Makromol. Chem. Supol.*, 8, 3(1984), Yuusuke Kawakami, *Kaqaku Koogyo* (Chemical Industry), 38, 56(1987), Yuuya Yamashita, *Kobunshi* (Macromolecules), 31, 988(1982), Shiro Kobayashi, *Kobunshi* (Macromolecules), 30, 625(1981), Toshinobu Higashimura, *Journal of Adhesion Society of Japan*, 18, 536(1982), Koichi Ito, *Kobunshi Kako* (Macromolecule Processing), 35, 262(1986), and Kishiro Higashi & Takashi Tsuda, *Kinozairyo* (Functional Materials), 1987, No. 10, 5, and the literature references and patents cited therein.

Then, the monomer shown by formula (III), which forms the comb-like copolymer for use in this invention as a cooolymer component together with the aforesaid macromonomer (M) is described in detail.

In formula (III), $X^1$ has the same meaning as $X^o$ in formula (IIa) and represents preferably —COO—, —OCO—, —CH$_2$OCO—, —CH$_2$COO—, —O—, or

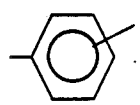

$Q^1$ has the same meaning as $Q^o$ in formula (IIa) and represents preferably an aliphatic group having from 1 to 22 carbon atoms. Practical examples thereof are same as the aliphatic group shown by $Z^1$ in formula (I) described above.

In formula (III), $d^1$ and $d^2$, which may be the same or different, have practically the same meaning as $a^1$ and $a^2$ in formula (I). It is preferred that one of $d^1$ and $d^2$ represents a hydrogen atom.

The comb-like copolymer for use in this invention may further contain monomers other than the monomer shown by formula (III) as a copolymer component, such other monomers being copolymerizable with the monomer of formula (III).

Examples of other monomers described above include acrylonitrile, methacrylonitrile, acrylamide, methacrylamide, styrene, chlorostyrene, bromostyrene, vinylnaphthalene, heterocyclic compounds having a polymerizable double bond (e.g., vinylpyridine, vinylimidazoline, vinylthiophene, vinyldioxane, and vinylpyrrolidone), unsaturated carboxylic acids (e.g., acrylic acid, methacrylic acid, itaconic acid, crotonic acid, and maleic acid), itaconic anhydride, and maleic anhydride.

These monomers other than the monomer shown by formula (III) may be copolymerizable and the content of such other monomer is preferably less than 30% by weight of the total monomer components of the comb-like copolymer.

Furthermore, the comb-like copolymer for use in this invention may have the specific polar group at only one terminal of the polymer main chain thereof.

That is, the polar group is selected from —PO$_3$H$_2$, —SO$_3$H, —COOH, —OH, —SH,

(wherein $Z^o$ represents —$Z^{10}$ or —$OZ^{10}$ (wherein $Z^{10}$ represents a hydrocarbon group)), a formyl group, and an amino group.

In the polar group shown by

$Z^{10}$ of $Z^o$ represents preferably a hydrocarbon group having from 1 to 18 carbon atoms, and preferred examples of the hydrocarbon group include an aliphatic group having from 1 to 8 carbon atoms, which may be substituted (e.g., methyl, ethyl, propyl, butyl, pentyl, hexyl, butenyl, pentenyl, hexenyl, 2 chloroethyl, 2-cyanoethyl, cyclopentyl, cyclohexyl, benzyl, phenethyl, chlorobenzyl, and bromobenzyl) and an aromatic group which may be substituted (e.g., phenyl, tolyl, xylyl, mesityl, chlorophenyl, bromophenyl, methoxyphenyl, and cyanophenyl).

Also, in the aforesaid polar groups, the amino group represents —NH$_2$, —NHZ$^{11}$or

wherein $Z^{11}$ and $Z^{12}$ each represents a hydrocarbon group having from 1 to 18 carbon atoms, and preferably 1 to 8 carbon atoms. Specific examples of the hydrocarbon group for $Z^{11}$ and $Z^{12}$ are those described above for $Z^1$.

Furthermore, more preferred hydrocarbon groups represented by $Z^{10}$, $Z^{11}$, and $Z^{12}$ include an alkyl group having from 1 to 4 carbon atoms, which may be substituted, and a phenyl group which may be substituted.

In this case, the comb-like copolymer has a chemical structure that the polar group is bonded to one terminal of the polymer main chain directly or via an optional linkage group. The linkage group bonding the polar group to the comb-like copolymer component is composed of an optional combination of atomic groups such as a carbon-carbon bond (single bond or double bond), a carbon-hetero atom bond (examples of the hetero atom are oxygen, sulfur, nitrogen and silicon), and a hetero atom-hetero atom bond.

Preferred copolymers in the comb-like copolymer having the specific polar group at one terminal of the polymer main chain for use in this invention are represented by formula (Va) or (Vb):

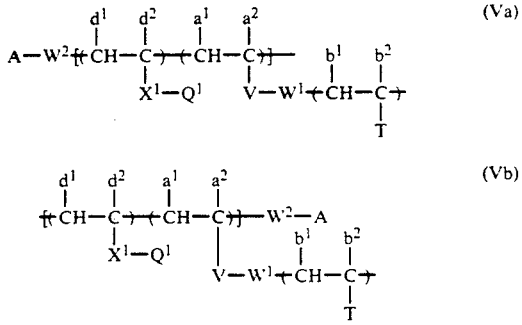

wherein $a^1$, $a^2$, $b^1$, $b^2$, $d^1$, $d^2$, $X^1$, $Q^1$, V, $W^1$ and T are the same as those in formulae (I), (IIa) (IIb), (III), and (IV); and A represents the aforesaid polar group bonded to one terminal of the main chain of the comb-like copolymer.

In the above formulae, $W^2$ represents a chemical bond or a linkage group bonding the specific polar group A to the polymer main chain, and practically, has the same meaning as those described above for $W^1$.

In the case of the comb-like copolymer having the specific polar group at one terminal of the polymer main chain as described above, it is preferred that the copolymer does not contain in the polymer main chain a copolymer component having a polar group such as a phosphono group, a carboxy group, a sulfo group, a hydroxy group, a formyl group, an amino group, a mercapto group, and

(wherein $Z^o$ is the same as described above).

The comb-like copolymer having the specific polar group at only one terminal of the polymer main chain can be easily produced by (1) a method (a method by an ion polymerization) of reacting various reagents to one terminal of a living polymer obtained by a conventionally known anion polymerization or cation polymerization, (2) a method (a method by a radical polymerization) of performing a radical polymerization using a polymerization initiator and/or a chain transfer agent each having the specific polar group in the molecule, or (3) a method of forming a copolymer having a reactive group at one terminal thereof by the ion polymerization or radical polymerization as described above and converting the reactive group into the specific polar group by a macromolecular reaction.

Practical methods for producing the comb-like copolymer are described in P. Dreyfuss & R. P. Quirk, Encycl. Polym. Sci. Eng., 7, 551 (1987), Yoshiki Nakajo & Yuya Yamashita, Senryo to Yakuhin (Dyes and Chemicals), 30, 232 (1985), and Akira Ueda & Susumu Nagai, Kagaku to Kogyo (Science and Industry), 60, 57 (1986) and the literature references cited therein.

Examples of the aforesaid polymerization initiator having the specific polar group in the molecule are 4,4'-azobis(4-cyanovaleic acid), 4,4'azobis(4-cyanovaleric acid chloride), 2,2'-azobis(2-cyanopropanol), 2,2'-azobis(2-cyanopentanol), 2,2'-azobis[2-methyl-N-(2-hydroxyethyl)-propioamide], 2,2'-azobis[2-methyl-N-[1,1-bis(hydroxymethyl)ethyl]propioamide}, 2,2'-azobis{2-methyl-N-[1,1-bis(hydroxymethyl)-2-hydroxyethyl]propioamide}, 2,2'-azobis[2-(5-methyl-2-imidazolin-2-yl)propane], 2,2'-azobis[2-(4,5,6,7-tetrahydro-1H-1,3-diazepin-2-yl)propane], 2,2'-azobis[2-([2-(5-hydroxy-3,4,5,6-tetrahydropyrimidin-2-yl)propane], 2,2'-azobis-2-(5-hydroxy-3,4,5,6-tetrapyrimidin-2-yl)propane], 2,2'azobis}2-[1-(2-hydroxyethyl)-2-imidazolin-2-yl]propane}, 2,2'-azobis[N-(2-hydroxyethyl) 2-methylpropionamidine], and 2,2'-azobis[N-(4-aminophenyl)-2methylpropionamidine].

Also, examples of the chain transfer agent having the specific polar group in the molecule are mercapto compounds having the polar group or a substituent capable of being induced into the polar group (e.g., thioglycolic acid, thiomalic acid, thiosalicylic acid, 2-mercaptopropionic acid, 3-mercaptopropionic acid, 3-mercaptobutyric acid, N-(2-mercaptopropionyl)glycine, 2-mercaptonicotinic acid, 3[N-(2-metcaptoethyl)carbamoyl]-propionic acid, 3-[N-(2-(mercaptoethyl)amino]propionic acid, N-(3-mercaptopropionyl)aranine, 2-mercaptoethanesulfonic acid, 3-mercaptopropanesulfonic acid, 4 -mercaptobutanesulfonic acid, 2-mercaptoethanol, 3-mercapto-1,2-propanediol, 1-mercapto-2-propanol, 3,-mercapto-2-butanol, mercaptophenol, 2-propanol, 2-mercaptoethylamine, 2-mercaptoimidazole and 2-mercapto-3-pyridinol) and iodized alkyl compound's having the polar group or a substituent capable of being converted into the polar group (e.g., iodoacetic acid, iodopropionic acid, 2-iodoethanol, 2-iodoethanesulfonic acid, and 3-iodopropanesulfonic acid). The mercapto compounds are preferred in this invention.

The content of the chain transfer agent or the polymerization initiator of from 0.1 to 10 parts by weight, and preferably from 0.5 to 5 parts by weight based on 100 parts of the total monomers.

The preferred comb-like copolymers having the polar group at one terminal of the main chain of the copolymer are shown by aforesaid formula (Va) or (Vb) and the moiety shown by A—$W^2$—in these formulae are practically illustrated below. However, it is to be noted that the scope of this invention is not limited to these specific examples.

In the following formulae, $k_1$ represents 1 or 2; $k_2$ represents an integer of from 2 to 16; and $k_3$ represents an integer of from 1 to 3;

   (C)-1

   (C)-2

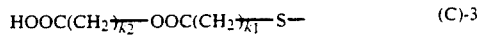   (C)-3

-continued
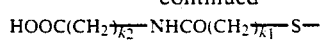 (C)-4
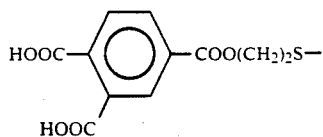 (C)-5
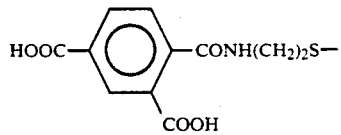 (C)-6
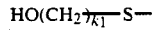 (C)-7
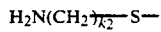 (C)-8
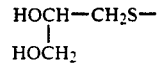 (C)-9
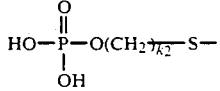 (C)-10
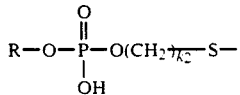 (C)-11
R: an alkyl group of 1 to 6 carbon atoms
 (C)-12
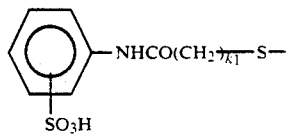 (C)-13
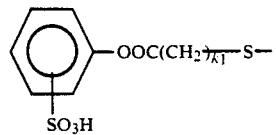 (C)-14
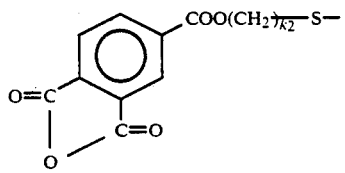 (C)-15
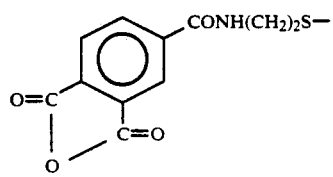 (C)-16
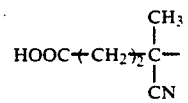 (C)-17
-continued
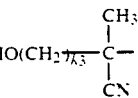 (C)-18
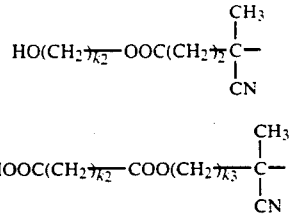 (C)-19
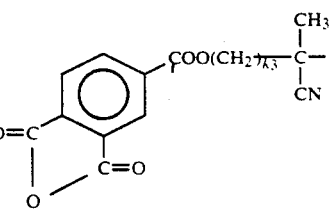 (C)-20
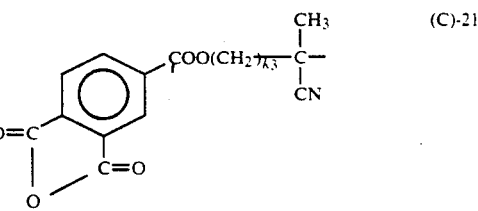 (C)-21
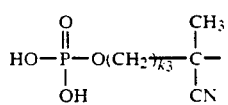 (C)-22
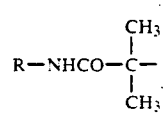 (C)-23
R: HO(CH$_2$)$_{\overline{2}}$, H$_3$C—C—
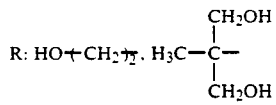 (C)-24
Z: (CH$_2$)$_{\overline{3}}$, (CH$_2$)$_{\overline{4}}$, —CH$_2$CHCH$_2$—
R': —H, —CH$_2$CH$_2$OH
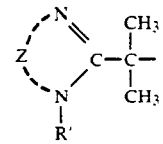 (C)-25
R''; —CH$_2$CH$_2$OH,
(R$_1$; H, —NH$_2$, —OH)
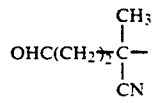 (C)-26
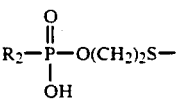 (C)-27

R₂: an alkyl group of 1 to 6 carbon atoms

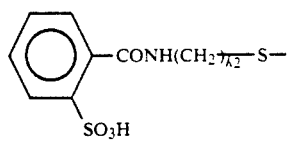 (C)-28

HOOC(CH₂)₂NH(CH₂)̄ₓ₁̄S— (C)-29

HOOC+CH₂)̄ₓ₂̄CONH(CH₂)̄ₓ₂̄S— (C)-30

As the monomer (A) for use in this invention, any mono-functional monomers which are soluble in the aforesaid non-aqueous solvent but become insoluble in the aforesaid non-aqueous solvent by being polymerized can be used. Specific examples of the monomer are represented by the following formula (VI):

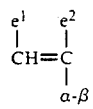 (VI)

wherein α represents —COO—, OCO—, —CH₂OCO—, —CH₂COO—, —O—

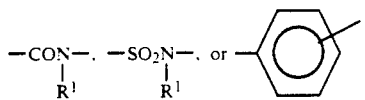

(wherein R¹ represents a hydrogen atom or an aliphatic group having from 1 to 18 carbon atoms which may be substituted (e.g., methyl, ethyl, propyl, butyl, 2-chloroethyl, 2-bromoethyl, 2-cyanoethyl, 2-hydroxyethyl, benzyl, chlorobenzyl, methylbenzyl, methoxybenzyl, phenethyl, 3-phenylpropyl, dimethylbenzyl, fluorobenzyl, 2-methoxyethyl, and 3-methoxypropyl)); β represents a hydrogen atom or an aliphatic group having from 1 to 6 carbon atoms which may be substituted (e.g., methyl, ethyl, propyl, butyl, 2-chloroethyl, 2,2-dichloroethyl, 2,2,2-trifluoroethyl, 2-bromoethyl, 2-glycidylethyl, 2-hydroxyethyl, 2-hydroxypropyl, 2,3-dihydroxypropyl, 2-hydroxy-3-chloropropyl, 2-cyanoethyl, 3-cyanopropyl, 2-nitroethyl, 2-methoxyethyl, 2-methanesulfonylethyl, 2-ethoxyethyl, N,N-dimethylaminoethyl, N,N-diethylaminoethyl, trimethoxysilylpropyl, 3-bromopropyl, 4-hydroxybutyl, 2-furfurylethyl, 2-thienylethyl, 2-pyridylethyl, 2-morpholinoethyl, 2-carboxyethyl, 3-carboxypropyl, 4-carboxybutyl, 2-phosphoethyl, 3-sulfopropyl, 4-sulfobutyl, 2-carboxyamidoethyl, 3-sulfoamidopropyl, 2-N-methylcarboxyamidoethyl, cyclopentyl, chlorocyclohexyl, and dichlorohexyl); and e¹ and e², which may be the same or different, each has the same meaning as a¹ or a² in formula (I) described above.

Specific examples of the monomer (A) are vinyl esters or allyl esters of an aliphatic carboxylic acid having from 1 to 6 carbon atoms (e.g., acetic acid, propionic acid, butyric acid, monochloroacetic acid, and trifluoropropionic acid); alkyl esters or alkylamides having from 1 to 4 carbon atoms, which may be substituted, of an unsaturated carboxylic acid such as acrylic acid, methacrylic acid, crotonic acid, itaconic acid, maleic acid, etc. (examples of the aforesaid alkyl moiety are methyl, ethyl, propyl, butyl, 2-chloroethyl, 2-bromoethyl, 2-fluoroethyl, trifluoroethyl, 2-hydroxyethyl, 2-cyanoethyl, 2-nitroethyl, 2-methoxyethyl, 2-methanesulfonylethyl, 2-benzenesulfonylethyl, 2-(N,N-dimethylamino)ethyl, 2-(N,N-diethylamino)ethyl, 2-carboxyethyl, 2-phosphoethyl, 4-carboxybutyl, 3-sulfopropyl, 4-sulfobutyl, 3-chloropropyl, 2-hydroxy-3-chloropropyl, 2-furfurylethyl, 2-pyridinylethyl, 2-thienylethyl, trimethoxysilylpropyl, and 2-carboxyamidoethyl]; styrene derivatives (e.g., styrene, vinyltoluene, α-methylstyrene, vinylnaphthalene, chlorostyrene, dichlorostyrene, bromostyrene, vinylbenzenecarboxylic acid, vinylbenzenesulfonic acid, chloromethylstyrene, hydroxymethylstyrene, methoxymethylstyrene N,N-dimethylaminomethylstyrene, vinylbenzenecarboxyamide, and vinylbenzenesulfonamide); unsaturated carboxylic acids such as acrylic acid, methacrylic acid crotonic acid, maleic acid, and itaconic acid; cyclic anhydrides of maleic acid or itaconic acid; acrylonitrile; methacrylonitrile; and heterocyclic compounds having a polymerizable double bond group (practical examples are the compounds described in *Kobunshi (Macromolecule) Data Handbook*, pages 175 to 184, edited by Kobunshi Gakkai, published by Baifukan, 1986, such as N vinylpyridine, N-vinylimidazole, N-vinylpyrrolidone, vinylthiophene, vinyltetrahydrofuran, vinyloxazoline, vinylthiazole, and N-vinylmorpholine).

The aforesaid monomers (A) may be used alone or as a mixture thereof.

According to a preferred embodiment of this invention, the dispersion resin grains for use in this invention are obtained by copolymerizing a monomer (B-1) containing an aliphatic group having at least 8 carbon atoms with the mono-functional monomer (A) which is soluble in the aforesaid non-aqueous solvent but becomes insoluble therein by polymerization.

Practical examples of the monomer (B-1) having an aliphatic group of at least 8 carbon atoms are shown by the following formula (IV-1):

 (IV-1)

wherein R¹ represents an aliphatic group having at least 8 carbon atoms; G represents —COO—, —CONH—,

(wherein R² represents an aliphatic group having from 1 to 22 carbon atoms), —OCO—, —CH₂COO—or —O—, and e¹ and e², which may be the same or different, each represents a hydrogen atom, an alkyl group, —COOR³, or —CH₂—COOR³ (wherein R³ represents an aliphatic group having from 1 to 22 carbon atoms).

Then, the monomer (B-1) shown by formula (IV-1) is described in detail.

In a preferred embodiment of the monomer shown by formula (IV-1), RI represents an alkyl group having at least 10 total carbon atoms, which may be substituted, or an alkenyl group having at least 10 total carbon atoms; G represents —COO—, —CONH—,

(wherein $R^2$ represents preferably an aliphatic group having from 1 to 32 carbon atoms (e.g., an alkyl group, an alkenyl group or an aralkyl group)), —OCO—, —CH$_2$OCO—, or —O—; and $e^1$ and $e^2$, which may be the same or different, each represents preferably a hydrogen atom, a methyl group, —COOR$^3$, or —CH$_2$COOR$^3$ (wherein $R^3$ represents preferably an alkyl group having from 1 to 32 carbon atoms, an alkenyl group having from 3 to 32 carbon atoms, an aralkyl group having from 7 to 32 carbon atoms or a cycloalkyl group having from 5 to 32 carbon atoms).

In formula (IV-1), it is more preferably that G a represents —COO—, —CONH—, or

$e^1$ and $e^2$, which may be the same or different, each represents a hydrogen atom or a methyl group; and $R^1$ is the same as above.

Specific examples of the monomer (B-1) shown by formula (IV-1) described above are esters of an unsaturated carboxylic acid such as acrylic acid, methacrylic acid, crotonic acid, maleic acid, itaconic acid, etc., having an aliphatic group having from 10 to 32 carbon atoms (the aliphatic group may have a substituent such as a halogen atom, a hydroxy group, an amino group, an alkoxy group, etc., and the carbon-carbon bond of the main chain thereof may contain a hetero atom such as oxygen, sulfur, nitrogen, etc., and examples of the aliphatic group are decyl, dodecyl, tridecyl, tetradecyl, hexadecyl, octadecyl, docosanyl, dodecenyl, hexedecenyl, oleyl, linoleyl, and docosenyl); amides of the aforesaid unsaturated carboxylic acid having aliphatic group (examples of the aliphatic group are the same as those described above for the esters); vinyl esters or allyl esters of higher fatty acid (examples of the higher fatty acid are lauric acid, myristic acid, stearic acid, oleic acid, linolic acid, and behenic acid); and vinyl ethers substituted with an aliphatic group having from 10 to 32 total carbon atoms (examples of the aliphatic group are the same as those of the aliphatic group of the aforesaid unsaturated carboxylic acid).

According to the aforesaid embodiment, the dispersion resin grains are composed of at least one kind of the monomer (A) and at least one kind of the monomer (B-1). It is important that the resin grains synthesized by these monomers are insoluble in the aforesaid non-aqueous solvent in order to produce the desired dispersion resin grains.

More practically, it is preferred that the proportion of the monomer (B-1) represented by formula (IV-1) in the dispersion resin grains is from 0.1 to 20% by weight based on the amount of the monomer (A) being insolubilized and also the proportion thereof is more preferably from 0.3 to 8% by weight.

Also, the molecular weight of the dispersion resin for use in this invention is preferably from $1 \times 10^3$ to $1 \times 10^6$, and more preferably from $1 \times 10^4$ to $1 \times 10^6$.

The liquid developer for electrostatic photography in the aforesaid embodiment has a feature of showing a very excellent re-dispersibility by using the monomer (B-1).

In accordance with another preferred embodiment of this invention, the dispersion resin grains are obtained by copolymerizing the mono-functional monomer (A) which is soluble in the aforesaid non-aqueous solvent but becomes insoluble in the non-aqueous solvent by being polymerized and a monomer (B-2) having at least two polar groups and/or polar linkage groups.

Practical examples of the monomer (B-2) having at least two polar groups and/or polar linkage groups are represented by the following formula (IV-2):

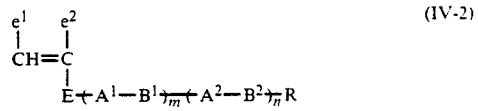

wherein E represents —O—, —COO—, —OCO—, —CH$_2$OCO—, —SO$_2$, —CONH, —SO$_2$NH—,

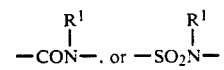

(wherein $R^1$ represents a hydrogen atom or has the same meaning as the linkage group $A^1$—$B^1$ $A^2$—$B^2$ R in formula (IV-2)); R represents a hydrogen atom or a hydrocarbon group having from 1 to 18 carbon atoms, which may be substituted with a halogen atom, —OH, —CN, —NH$_2$, —COOH, —SO$_3$H or —PO$_3$H$_2$; $B^1$ and $B^2$, which may be the same or different, each represents —O—, —S—, —CO—, —CO$_2$—, —OCO—, —SO$_2$—

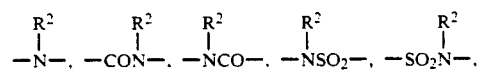

—NHCO$_2$—, or —NHCONH—(wherein $R^2$ has the same meaning as R described above); $A^1$ and $A^2$, which may be the same or different, each represents a hydrocarbon group having from 1 to 18 carbon atoms, which may be substituted or may have, in the main chain, a bond

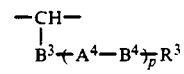

wherein $B^3$ and $B^4$, which may be the same or different, have the same meaning as $B^1$ and $B^2$ described above; $A^4$ represents a hydrocarbon group having from 1 to 18 carbon atoms; and $R^3$ has the same meaning as R described above; $e^1$ and $e^2$, which may be the same or different, each represents a hydrogen atom, a hydrocarbon group, —COO—R$^4$, or —COO—R$^4$ bonded via a hydrocarbon group (wherein $R^4$ represents a hydrogen atom or a hydrocarbon group which may be substituted); and m, n, and p, which may be the same or different, each represents an integer of from 0 to 4, with the proviso that m, n, and p cannot be 0 at the same time.

Then, the monomer (B-2) shown by formula (IV-2) used in this invention is described in detail.

In formula (IV-2), E represents preferably —O—, —COO—, —OCO—, —CH$_2$OCO—, —CONH—, or

(wherein $R^1$ represents preferably an alkyl group having from 1 to 16 total carbon atoms which may be substituted, an alkenyl group having from 2 to 16 total carbon atoms which may be substituted, an alicyclic group having from 5 to 18 total carbon atoms which may be substituted, or has the same meaning as the linkage group, $\{A^1 + B^1\}_m A^2 - B^2\}_n R$ in formula (IV-2)).

R represents preferably a hydrogen atom or an aliphatic group having from 1 to 16 total carbon atoms (wherein examples of the aliphatic group are an alkyl group, an alkenyl group and an aralkyl group) which may be substituted with a halogen atom (e.g., chlorine and bromine), —OH, —CN, or —COOH.

$B^1$ and $B^2$, which may be the same or different, each represents preferably —O—, —S—, —CO—, —COO—, —OCO—,

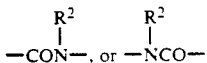

(wherein $R^2$ has the same meaning as R described above).

$A^1$ and $A^2$, which may be the same or different, each represents preferably a hydrocarbon group having from 1 to 12 carbon atoms (wherein examples of the hydrocarbon group are an alkylene group, an alkenylene group, an arylene group, and a cycloalkylene group) which may be substituted or has

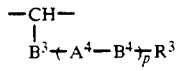

in the main chain bond (wherein $B^3$ and $B^4$, which may be the same or different, have the same meaning as $B^1$ and $B^2$ described above); $A^4$ represents preferably an alkylene group, an alkenylene group or an arylene group each having not more than 12 carbon atoms, each group may be substituted; and $R^3$ has the same meaning as R described above.

Also, $e^1$ and $e^2$, which may be the same or different, each represents preferably a hydrogen atom, a methyl group, —COO—$R^4$, or —CH$_2$COO—$R^4$ (wherein $R^4$ represents preferably a hydrogen atom, an alkyl group having from 1 to 18 carbon atoms, an alkenyl group having not more than 18 carbon atoms, an aralkyl group having not more than 18 carbon atoms, or a cycloalkyl group having not more than 18 carbon atoms).

Furthermore, m, n, and p, which may be the same or different, each represents preferably an integer of from 0 to 3, with the proviso that m, n, and p cannot be 0 at the same time.

Furthermore, in a more preferred embodiment of formula (IV-2), E represents —COO—, —CONH— or

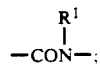

$e^1$ and $e^2$, which may be the same different, each represents hydrogen atom, a methyl group, —COO—$R^4$, or —CH$_2$COO—$R^4$ (wherein $R^4$ represents more preferably an alkyl group having from 1 to 12 carbon atoms).

Furthermore, specific examples of $A^1$ and $A^2$ are composed of an optional combination of atomic groups of

(wherein $R^6$ and $R^7$ each represents a hydrogen atom, an alkyl group, or a halogen atom),

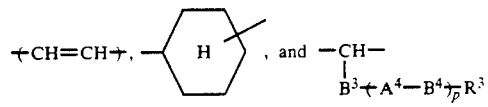

(wherein $B^3$, $B^4$, $A^3$, $A^4$, and p are the same as described above).

Also, in the linkage group

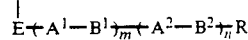

in formula (IV-2), each linkage main chain composed of E, $A^1$, B, $A^2$, $B^2$, and R is preferably composed of 8 or more total atoms. In this case, when E represents

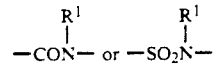

and $R^1$ represents $(A^1-B^1)_m A^2 B^2)_n R$, the linkage main chain composed of $R^1$ is included in the aforesaid linkage main chain. Furthermore, when $A^1$ and $A^2$ each is a hydrocarbon group having

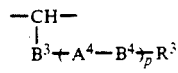

in the main chain bond, —$B^3(A^4-B^4)_p R^3$ is included in the aforesaid linkage main chain.

The number of atoms of the linkage main chain is as follows. For example, when E represents an oxo group (=O) or a hydrogen atom, these atoms are not included in the number of atoms in the linkage main chain and the carbon atom, the ether-type oxygen atom and the nitrogen atom constituting the linkage main chain are included as the number of atoms thereof. Thus, the number of atoms of —COO—or —CONH—is counted as 2. Similarly, when R represents —C$_9$H$_{19}$, the hydrogen atoms are not included as the number of atoms in the linkage main chain and the carbon atoms are included. Thus, in this case the number or atoms is counted as 9.

Then, specific examples of the monomer (B-2) are illustrated below.

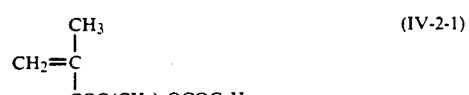
 (IV-2-1)

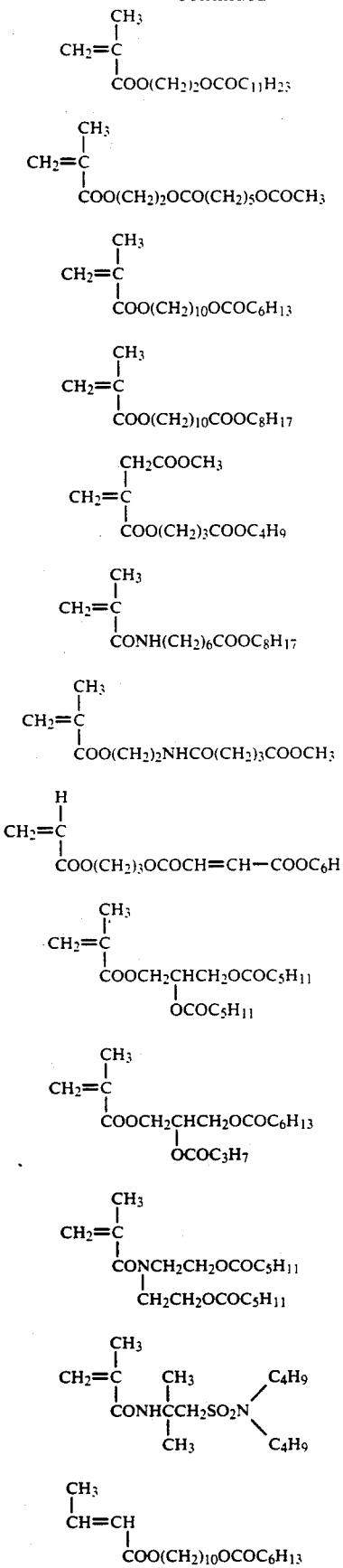
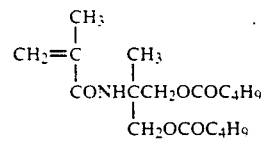
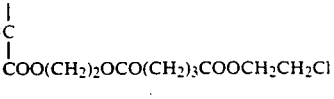
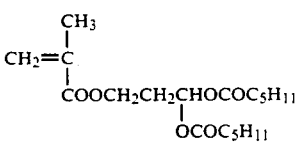
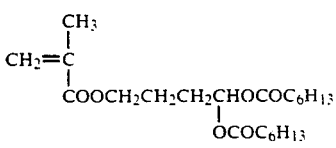
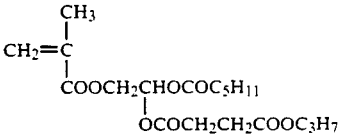
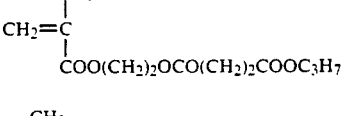
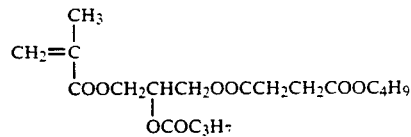
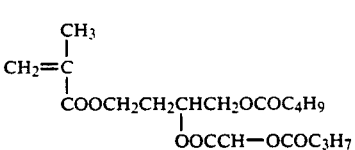
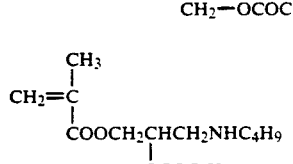
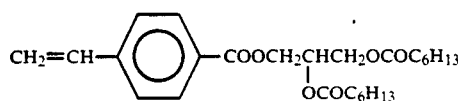
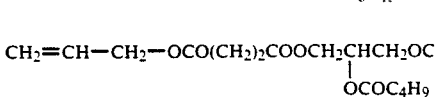

-continued

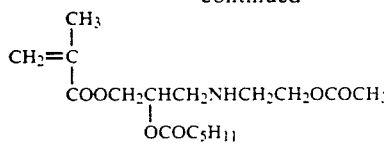
(IV-2-27)

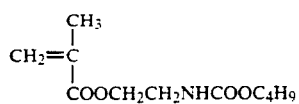
(IV-2-28)

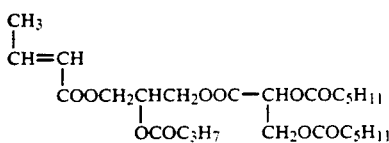
(IV-2-29)

According to the aforesaid embodiment, the dispersion resin grains in this invention are composed of at least one kind of the monomer (A) and at least one kind of the monomer (B-2). It is important that the resin synthesized by these monomers are insoluble in the aforesaid non-aqueous solvent in order to obtain the desired dispersed resin grains, used in the present invention.

More practically, the proportion of the monomer (B-2) represented by formula (IV-2) to the monomer (A) being insolubilized by the polymerization thereof is preferably from 0.1 to 10% by weight, and more preferably from 0.2 to 8% by weight. Also, the molecular weight of the dispersion resin in the embodiment is preferably from $1 \times 10^3$ to $1 \times 10^6$, and more preferably from $1 \times 10^4$ to $1 \times 10^6$.

The liquid developer for electrostatic photography according to the aforesaid embodiment of this invention has, by the use of the monomer (B-2) together with the monomer (A), a feature that the developer shows an excellent fixing property while keeping the good re-dispersibility.

The aforesaid dispersion resin grains for use in this invention can be obtained by heat-polymerizing the aforesaid dispersion-stabilizing resin, the monomer (A), and, if necessary, the monomer (B-1) or (B-2) described above in a non-aqueous solvent in the presence of a polymerization initiator such as benzyl peroxide, azobisisobutyronitrile, butyl lithium, etc.

Practically, the dispersion resin grains are obtained by (1) a method of adding the polymerization initiator to a solution containing the dispersion-stabilizing resin, the monomer (A), and, if necessary, the monomer (B-1) or (B-2), (2) a method of adding dropwise the polymerization initiator together with the monomer (A) and, if necessary, the monomer (B-1) or (B-2) to a solution having dissolved therein the dispersion-stabilizing resin, (3) a method of optionally adding to a solution containing a total amount of the dispersion-stabilizing resin and a part of the monomer (A) and, if necessary, the monomer (B-1) or (B-2) the remaining monomer (A) and, if necessary, the monomer (B-1) or (B-2) together with the polymerization initiator, or (4) a method of adding a solution of the dispersion-stabilizing resin, the monomer (A) and, if necessary, the monomer (B-1) or (B-2) to a non-aqueous solvent together with the polymerization initiator.

The total amount of the monomer (A) and the monomer (B-1) or (B-2) is from 5 to 80 parts by weight, and preferably from 10 to 50 parts by weight, per 100 parts by weight of the non-aqueous solvent.

The proportion of the soluble resin which is the dispersion-stabilizing resin is from 1 to 100 parts by weight, and preferably from 5 to 50 parts by weight per 100 parts by weight of the total monomers.

The proper amount of the polymerization initiator is from 0.1 to 5% by weight of the amount of the total monomers.

The polymerization temperature is from about 50° to 180° C., and preferably from 60° to 120° C. and the reaction time is preferably from 1 to 15 hours.

When the aforesaid polar solvent such as an alcohol, an ether, an ester, etc., is used in the non-aqueous solvent in the reaction, or unreacted monomers (A) and (B-1) or (B-2) remain without being polymerization granulated, it is preferred to remove the polar solvent and/or the monomers by heating to the boiling point of the monomers or by distillation under reduced pressure.

The molecular weight of the dispersion resin grains is from $1 \times 10^3$ to $1 \times 10^6$, and preferably from $1 \times 10^4$ to $1 \times 10^6$.

The non-aqueous system dispersion resin grains thus produced as described above exist as fine grains having a uniform grain size distribution and show a very stable dispersibility. In particular, when the liquid developer containing the dispersed resin grains is used repeatedly in a developing apparatus for a long period of time, the resin grains keep the good dispersibility and further, when the developing speed is increased, the resin grains can be easily re-dispersed and no staining on each part of the developing apparatus by adhesion of the resin grains is observed.

Also, when the resin grains are fixed by heating, etc., a strong film or coating is formed, which shows an excellent fixing property of the resin.

Furthermore, the liquid developer of this invention is excellent in dispersibility, re-dispersibility, and fixing property even when the developing-fixing steps are quickened and large-size master plates are used for making printing plates.

The liquid developer for electrophotography of this invention may contain, if desired, a coloring agent. As the coloring agent, various pigments or dyes can be used.

As an example of coloring the dispersion resin grains, there is a method of physically dispersing a pigment or a dye in the dispersion resin and various pigments and dyes are known for the purpose. For example, there are a magnetic iron oxide powder, powdered lead iodide, carbon black, nigrosine, Alkali Blue, Hanza Yellow, Quinacridone Red, and Phthalocyanine Blue.

As other method of coloring the dispersion resin, there is a method of dyeing the dispersion resin with a dye as described in JP-A-57-48738. Also, as other methods, there are a method of chemically bonding the dispersion resin and a dye as disclosed in JP-A-53-54029 and a method of using a monomer previously containing a dye in the production of the copolymer by a polymerization granulation to form a copolymer containing the dye as described in JP-B-44-22955.

The liquid developer of this invention may further contain, if desired, various additives for improving the charging characteristics and image characteristics as described, for example, in Yuji Harasaki, *Denshi Shashin (Electrophotography)*, Vol. 16, No. 2, page 44.

For example, there are metal salts of di-2-ethylhexylsulfosuccinic acid, metal salts of naphthenic acid, metal salts of a higher fatty acid, lecithin, poly(vinylpyrrolidone), and a copolymer containing a half maleic acid amide component.

Then, the amounts of the main components of the liquid developer of this invention are explained below.

The amount of the toner grains (resin grains) mainly composed of the resin and, if desired, a coloring agent) is preferably from 0.5 to 50 parts by weight per 1,000 parts by weight of the liquid carrier.

If the amount is less than 0.5 part by weight, the image density is insufficient, while if the amount exceeds 50 parts by weight, fog tends to form on non-image portions.

Furthermore, the aforesaid dispersion-stabilizing resin soluble in the liquid carrier is used, if desired, and the amount thereof is from about 0.5 to 100 parts by weight to 1,000 parts by weight of the liquid carrier.

Also, a charge controlling agent may be used in an amount of preferably from 0.001 to 1.0 part by weight per 1,000 parts by weight of the liquid carrier.

Moreover, if desired, various additives may be added and the upper limit of the total amount of these additives is regulated by the electric resistance of the liquid developer obtained. That is, if the electric resistance of the liquid developer in a state of excluding the toner grains is lower than $10^9 \Omega$ cm, image having good continuous tone is reluctant to obtain and hence it is necessary to control the addition amount of each additive within the aforesaid limit.

Now, the following examples are intended to illustrate the embodiments of this invention in detail but not to limit the scope of this invention in any way.

PRODUCTION EXAMPLE 1 OF MACROMONOMER: M-1

A mixture of 100 g of methyl methacrylate, 5 g of mercaptopropionic acid, and 200 g of toluene was heated to 75° C. with stirring under nitrogen gas stream and, after adding 1.0 g of 2,2'-azobis-isobutyronitrile (A.I.B.N) to the reaction mixture, the reaction was carried out for 4 hours. Then, after adding 0.5 g of A.I.B.N. to the reaction mixture, the reaction was carried out for 3 hours and, after further adding thereto 0.3 g of A.I.B.N., the reaction was carried out for 3 hours. Then, 8 g of glycidyl methacrylate, 1.0 g of N,N-dimethyldodecylamine, and 0.5 g of t-butylhydroquinone were added to the reaction mixture, and the resulting mixture was stirred for 12 hours at 100° C. After cooling, the reaction mixture was reprecipitated from 2 liters of methanol to obtain 82 g of the desired macromonomer as a white powder. The weight average molecular weight of the product was 6,500.

Macromonomer M-1:

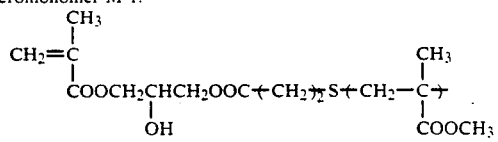

PRODUCTION EXAMPLE 2 TO 27 OF MACROMONOMERS: M-2 to M-27.

By following the same procedure as Production Example 1 of macromonomer except that each of the compound shown in Table 1 below was used in place of the methacrylate, each of Macromonomers M-2 to M-27 was produced. The weight average molecular weights of the macromonomers were from 5,000 to 7,000.

TABLE 1

$$CH_2=\underset{\underset{COOCH_2CHCH_2OOC+CH_2\xrightarrow{}_{2}S+CH-\underset{X}{\overset{a_2}{\underset{|}{C}}}\xrightarrow{}}{\overset{CH_3}{|}}}{\overset{CH_3}{\underset{|}{C}}}$$

| Production Example of Macromonomer | Macromonomer | $a_1/a_2$ | X |
|---|---|---|---|
| 2 | M-2 | —H/—CH₃ | $COOC_2H_5$ |
| 3 | M-3 | " | $COOC_3H_7(n)$ |
| 4 | M-4 | " | $COOC_4H_9(n)$ |
| 5 | M-5 | " | $COOC_4H_9(i)$ |
| 6 | M-6 | " | $COOC_8H_{17}$ |
| 7 | M-7 | " | $COOC_{12}H_{25}$ |
| 8 | M-8 | " | $COOC_{13}H_{27}$ |

TABLE 1-continued
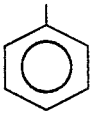
| Production Example of Macromonomer | Macro-monomer | $a_1/a_2$ | X |
|---|---|---|---|
| 9 | M-9 | " | $COOC_{16}H_{33}$ |
| 10 | M-10 | " | $COOC_{18}H_{37}$ |
| 11 | M-11 | —H/—H | $COOCH_3$ |
| 12 | M-12 | " | $COOC_4H_9$ |
| 13 | M-13 | —H/—H | $COOC_{12}H_{25}$ |
| 14 | M-14 | " | $COOC_{18}H_{37}$ |
| 15 | M-15 | —$CH_3$/—H | $COOCH_3$ |
| 16 | M-16 | " | $COOC_{10}H_{21}$ |
| 17 | M-17 | —H/—H | (phenyl) |
| 18 | M-18 | " | CN |
| 19 | M-19 | —H/—$CH_3$ | $COOCH_2CHCH_2OCOCH_3$ <br> $\|$ <br> $OCOCH_3$ |
| 20 | M-20 | " | $COO(CH_2)_2OCOC_9H_{19}$ |
| 21 | M-21 | " | $COO(CH_2)_2OCOC_6H_{13}$ |
| 22 | M-22 | " | $COOCH_2CHCH_2OCOCH_3$ <br> $\|$ <br> $OCOC_3H_7$ |
| 23 | M-23 | " | $COO(CH_2)_2OCO(CH_2)_2COOCH_3$ |
| 24 | M-24 | —H/—H | $COO(CH_2)_2COOC_4H_9$ |

TABLE 1-continued $$CH_2=\underset{\underset{COOCH_2CHCH_2OOC+CH_2\overline{)_2}S+CH-C+}{|}}{\overset{CH_3}{\overset{|}{C}}}\overset{a_1}{\underset{X}{\overset{|}{}}}\overset{a_2}{\underset{}{\overset{|}{}}}$$
$$\underset{OH}{}$$

| Production Example of Macromonomer | Macro-monomer | $a_1/a_2$ | X |
|---|---|---|---|
| 25 | M-25 | —H/—CH₃ | $\underset{COO(CH_2)_2COO(CH_2)_5OCOCH_3}{\|}$ |
| 26 | M-26 | " | $\underset{COO(CH_2)_2O(CH_2)_2OCH_3}{\|}$ |
| 27 | M-27 | —H/—H | phenyl-CH₂OC₆H₁₃ |

PRODUCTION EXAMPLE 28 OF MACROMONOMER: M-28

A mixture of 90 g of dodecyl methacrylate, 10 g of methacrylic acid, 5 g of thioethanol, and 200 g of toluene was heated to 70° C. with stirring under nitrogen gas stream and, after adding 1.0 g of A.I.B.N. to the reaction mixture, the reaction was carried out for 4 hours. Then, after adding 0.5 g of A.I.B.N. to the reaction mixture, the reaction was carried out for 3 hours and, after further adding thereto 0.3 g of A.I.B.N., the reaction was carried out for 3 hours. The reaction mixture was cooled to room temperature and, after adding thereto 18.2 g of 2-carboxyethyl methacrylate, a mixture of 24 g of dicyclohexylcarbodiimide (D.C.C.) and 150 g of methylene chloride was added dropwise to the mixture over a period of one hour. Then, 1.0 g of t-butylhydroquinone was added to the reaction mixture, and the resulting mixture was stirred for 4 hours.

The crystals precipitated were filtered off and the filtrate obtained was reprecipitated from 2 liters of methanol. The oily material thus precipitated was collected by decantation, dissolved in 150 ml of methylene chloride, and the solution was reprecipitated again from one liter of methanol. The oily material formed was collected and dried under reduced pressure to obtain 54 g of the desired macromonomer having a weight average molecular weight of 5,800.

Macromonomer M-28:

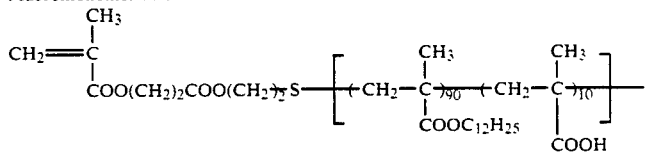

PRODUCTION EXAMPLES 29 TO 35 OF MACROMONOMER: M-29 to M-30

By following the same procedure as Production Example 28 of macromonomer by changing the methacrylate monomer (dodecyl methacrylate) and the unsaturated carboxylic acid (2-carboxyethyl methacrylate), each of the macromonomer shown in Table 2 below was produced. The weight average molecular weights of the macromonomers were from 5,000 to 7,000.

TABLE 2

| Production Example of Macromonomer | Macromonomer | Chemical Structure of Macromonomer |
|---|---|---|
| 29 | M-29 | $CH_2=CH$<br>$\|$<br>$COOCH_2CH_2S\text{\textlparen}CH_2-\underset{COOCH_3}{\overset{CH_3}{\overset{\|}{C}}}\text{\textrparen}$ |
| 30 | M-30 | $CH_2=\overset{CH_3}{\overset{\|}{C}}$<br>$\|$<br>$COOCH_2CH_2S\text{\textlparen}CH_2-\underset{COOCH_3}{\overset{CH_3}{\overset{\|}{C}}}\text{\textrparen}$ |

TABLE 2-continued

| Production Example of Macromonomer | Macromonomer | Chemical Structure of Macromonomer |
|---|---|---|
| 31 | M-31 | $CH_2=CH-\langle\bigcirc\rangle-COOCH_2CH_2S\text{\textlbrackdbl}CH_2-\overset{\overset{CH_3}{\mid}}{\underset{\underset{COOC_6H_{13}}{\mid}}{C}}\text{\textrbrackdbl}$ |
| 32 | M-32 | $CH_2=CH$<br>$\mid$<br>$CH_2COOCH_2CH_2S\text{\textlbrackdbl}CH_2-\overset{}{\underset{\underset{COOC_{12}H_{25}}{\mid}}{CH}}\text{\textrbrackdbl}$ |
| 33 | M-33 | $\overset{\overset{CH_3}{\mid}}{CH_2=C}$<br>$\mid$<br>$CONH\text{\textlbrackdbl}CH_2\text{\textrbrackdbl}_{10}-COOCH_2CH_2S\text{\textlbrackdbl}CH_2-\overset{\overset{CH_3}{\mid}}{\underset{\underset{COOC_{18}H_{37}}{\mid}}{C}}\text{\textrbrackdbl}$ |
| 34 | M-34 | $\overset{\overset{COOCH_3}{\mid}}{CH_2=C}$<br>$\mid$<br>$CH_2COOCH_2CH_2S\text{\textlbrackdbl}CH-\overset{\overset{CH_3}{\mid}}{\underset{\underset{COOC_3H_7}{\mid}}{CH}}\text{\textrbrackdbl}$ |
| 35 | M-35 | $\overset{\overset{CH_3}{\mid}}{CH_2=C}$<br>$\mid$<br>$COO(CH_2)_2OCO(CH_2)_2COO(CH_2)_2S\text{\textlbrackdbl}CH_2-\overset{\overset{CH_3}{\mid}}{\underset{\underset{COOCH_3}{\mid}}{C}}\text{\textrbrackdbl}_{95}\text{\textlbrackdbl}CH_2-\overset{}{\underset{\underset{COOH}{\mid}}{CH}}\text{\textrbrackdbl}_5-$ |

PRODUCTION EXAMPLE 36 OF MACROMONOMER: M-36

A mixture of 70 g of n-dodecyl methacrylate, 30 g of t-butyl methacrylate, 4 g of 2-mercaptoethylamine, and 200 g of tetrahydrofuran was heated to 70° C. with stirring under nitrogen gas stream. Then, after adding 1.0 g of A.I.B.N. to the reaction mixture, the reaction was carried out for 4 hours and, after further adding thereto 0.5 g of A.I.B.N., the reaction was carried out for 4 hours. Then, the reaction mixture was cooled to 20° C. in a water bath and, after adding 6.5 g of triethylamine to the reaction mixture, 5.6 g of acrylic acid chloride was added dropwise to the mixture with stirring at a temperature below 25° C. and then the mixture was further stirred for one hour in situ. Thereafter, 0.5 g of t-butylhydroquinone was added thereto and the mixture was stirred for 4 hours at 60° C.

After cooling, the reaction mixture was reprecipitated from 2 liters of methanol and then the same procedure was repeated once to obtain 63 g of the desired macromonomer as a light-yellow viscous product having a weight average molecular weight of 6,600.

Macromonomer M-36:

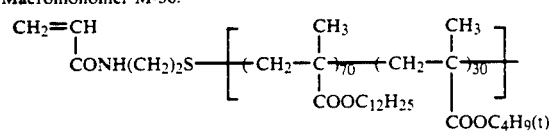

PRODUCTION EXAMPLE 37 OF MACROMONOMER: M-37

A mixture of 100 g of octadecyl methacrylate, 150 g of tetrahydrofuran, and 50 g of isopropyl alcohol was heated to 75° C. with stirring under nitrogen gas stream. After adding 4.0 g of 4,4-azobis(4-cyanovaleric acid) (A.C.V.) to the reaction mixture, the reaction was carried out for 5 hours and, after further adding thereto 1.0 g of A.C.V., the reaction was carried out for 4 hours. After cooling, the reaction mixture was reprecipitated from 1.5 liters of methanol, and an oily product thus precipitated was collected by decantation and dried under reduced pressure to obtain 85 g of an oily product.

To 50 g of the oily product (oligomer) obtained were added 15 g of glycidyl methacrylate, 1.0 g of N,N-dimethyldodecylamine, and 1.0 g of 2,2'-methylenebis(6-t-butyl-p-cresol), and the resulting mixture was stirred for 15 hours at 100° C. After cooling, the reaction mixture was reprecipitated from one liter of petroleum ether to obtain 42 g of the desired macromonomer as a white powder.

The weight average molecular weight thereof was 7,500.

Macromonomer M-37:

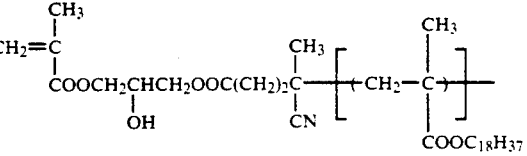

PRODUCTION EXAMPLE 38 OF MACROMONOMER: M-38

To a mixture of 50 g of the oligomer obtained as the intermediate in Production Example 37 of macromonomer, 2.8 g of 2 hydroxyethyl methacrylate, and 100 g of methylene chloride was added dropwise a mixture of 4.0 g of D.C.C., 0.5 g of 4-dimethylaminopyridine, and 10 g of methylene chloride with stirring at room temperature over a period of one hour, and the resulting mixture was stirred for 4 hours as it was. The crystals thus precipitated were filtered off, the filtrate was reprecipitated from one liter of methanol, and the procedure was repeated once again. Then, the powder formed was recovered and dried under reduced pressure to obtain 43 g of the desired macromonomer having a weight average molecular weight of 7,300.

Macromonomer M-38:

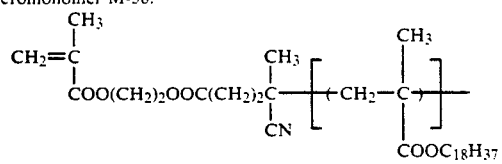

PRODUCTION EXAMPLE 1 OF DISPERSION-STABILIZING RESIN: P-1

A mixture of 80 g of octadecyl methacrylate, 20 g of Macromonomer M-1, and 150 g of toluene was heated to 75° C. with stirring under nitrogen gas stream. After adding 1.0 g of A.C.V. to the reaction mixture, the reaction was carried out for 4 hours and, after further adding thereto 0.3 g of A.C.V., the reaction was carried out for 3 hours. After cooling, the reaction mixture was reprecipitated in 2 liters of methanol, and the white powder thus precipitated was collected by filtration and dried to obtain 76 g of the desired resin having a weight average molecular weight of $4.8 \times 10^4$ as a white powder.

Dispersion-Stabilizing Resin P-1:

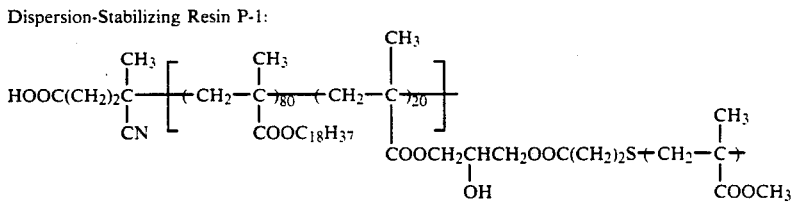

PRODUCTION EXAMPLES 2 TO 15 OF DISPERSION-STABILIZING RESIN: P-2 TO P-15

By following the same procedure as Production Example 1 of Resin P-1 except that each of the compounds shown in Table 3 below was used in place of octadecyl methacrylate and Macromonomer M-1, each of the dispersion-stabilizing resins shown in Table 3 was produced.

The weight average molecular weights of the resins were from $3.5 \times 10^4$ to $5.0 \times 10^4$.

TABLE 3

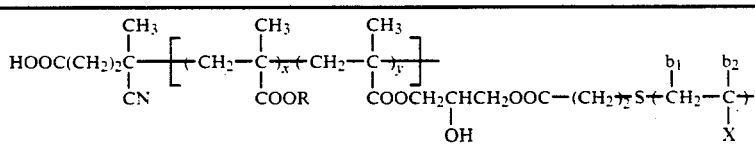

(x/y: weight composition ratio)

| Production Example of Resin | Dispersion-Stabilizing Resin | R | x/y | $b_1/b_2$ | X |
|---|---|---|---|---|---|
| 2 | P-2 | $-C_{16}H_{33}$ | 85/15 | $H/-CH_3$ | $-COOCH_3$ |
| 3 | P-3 | $-C_{12}H_{25}$ | 90/10 | " | " |
| 4 | P-4 | " | 60/40 | " | $-COOC_{18}H_{37}$ |
| 5 | P-5 | $-C_{18}H_{37}$ | " | " | " |
| 6 | P-6 | $-CH_3$ | 40/60 | " | " |
| 7 | P-7 | $-CH_2CHCH_2OCOCH_3$<br>$\quad\quad\;\;\mid$<br>$\quad\quad\;\;OCOCH_3$ | 50/50 | " | $-COOC_{16}H_{33}$ |
| 8 | P-8 | $-C_{18}H_{37}$ | 90/10 | H/H | 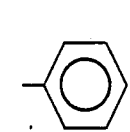 |
| 9 | P-9 | $-C_{18}H_{37}$ | 92/8 | H/H | $-CN$ |
| 10 | P-10 | $-C_{12}H_{25}$ | 80/20 | $H/-CH_3$ | $-COOCH_2CHCH_2OCOC_5H_{11}$<br>$\quad\quad\quad\quad\;\;\mid$<br>$\quad\quad\quad\quad\;\;OCOC_5H_{11}$ |
| 11 | P-11 | $-C_{13}H_{27}$ | 70/30 | " | $-COO(CH_2)_2OCOC_9H_{19}$ |
| 12 | P-12 | $-(CH_2)_2OCOC_{11}H_{23}$ | 75/25 | " | $-C_{12}H_{25}$ |

TABLE 3-continued $$\text{HOOC(CH}_2)_2\underset{\underset{CN}{|}}{\overset{\overset{CH_3}{|}}{C}}\!-\!\left[\!+\!CH_2\!-\!\underset{\underset{COOR}{|}}{\overset{\overset{CH_3}{|}}{C}}\!\!\right)_{\!\!x}\!\!+\!CH_2\!-\!\underset{\underset{COOCH_2CHCH_2OOC-(CH_2)_2S}{|}}{\overset{\overset{CH_3}{|}}{C}}\!\!\right)_{\!\!y}\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\underset{OH}{}\!\!+\!CH_2\!-\!\overset{b_1}{\underset{X}{\overset{|}{C}}}\!\!\right)_{\!\!b_2}$$

(x/y: weight composition ratio)

| Production Example of Resin | Dispersion-Stabilizing Resin | R | x/y | $b_1/b_2$ | X |
|---|---|---|---|---|---|
| 13 | P-13 | $-C_4H_9$ | 50/50 | " | $-C_{13}H_{27}$ |
| 14 | P-14 | $-CH_2CHC_4H_9$<br>$\quad\quad\; |$<br>$\quad\quad\;C_2H_5$ | 60/40 | " | $-C_{14}H_{29}$ |
| 15 | P-15 | $-C_{18}H_{37}$ | 70/30 | " | $-COO(CH_2)_2OCO(CH_2)_2COOCH_3$ |

PRODUCTION EXAMPLE 16 OF DISPERSION-STABILIZING RESIN: P-16

Dispersion-Stabilizing Resin P-16:

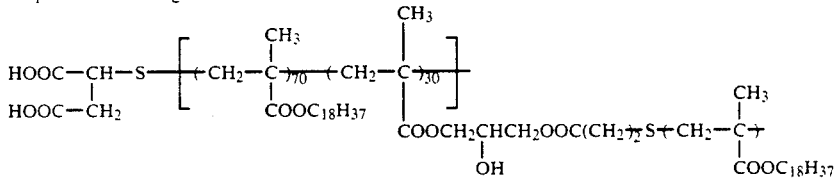

A mixture of 70 g of octadecyl methacrylate, 30 g of Macromonomer M-1, 0.8 g of thiomalic acid, 100 g of toluene, and 50 g of isopropyl alcohol was heated to 80° C. with stirring under nitrogen gas stream and, after adding 0.8 g of 1,1'-azobis(cyclohexane-1-carbocyanide) (A.B.C.C.) to the reaction mixture, the reaction was carried out for 4 hours. Then, after adding 0.4 g of A.B.C.C., the reaction was carried out for 3 hours and, after further adding thereto 0.3 g of A.B.C.C., the reaction was carried out for 4 hours. After cooling, the reaction mixture was reprecipitated from 2 liters of methanol, and the white powder thus precipitated was collected by filtration and dried to obtain 78 g of the desired resin having a weight average molecular weight of $3.8 \times 10^4$ as a white powder.

PRODUCTION EXAMPLES 17 TO 25 OF DISPERSION-STABILIZING RESIN: P-17 TO P-25

By following the same procedure as Production Example of Resin P-16 except that each of the compounds shown in Table 4 below was used in place of octadecyl methacrylate, Macromonomer M-10, and the mercapto compound (thiomalic acid), each of the resins P-17 to P-25 was produced.

The weight average molecular weights of the resins were from $3.0 \times 10^4$ to $4 \times 10^4$.

TABLE 4

$$W-S-\left[+CH_2-\underset{\underset{COOR}{|}}{\overset{\overset{CH_3}{|}}{C}}\right]_{x_1}(X)_{x_2}+CH_2-\underset{\underset{COO+CH_2)_2OOC(CH_2)_2S+CH_2-\underset{\underset{COOR'}{|}}{\overset{\overset{CH_3}{|}}{C}}+_y}{|}}{\overset{\overset{}{|}}{}}\right]$$

($x_1/x_2/y$: weight component ratio)

| Production Example of Resin | Dispersion-Stabilizing Resin | —W | R | X | $x_1/x_2/y$ | R' |
|---|---|---|---|---|---|---|
| 17 | P-17 | HOOCCH$_2$— | —C$_{18}$H$_{37}$ | — | 70/0/30 | —C$_4$H$_9$ |
| 18 | P-18 | 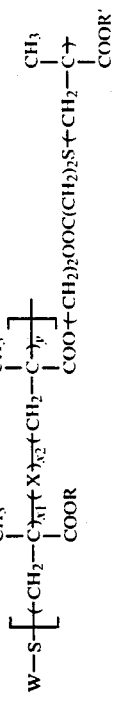 (2-COOH phenyl) | —C$_{12}$H$_{25}$ | — | 60/0/40 | —C$_{12}$H$_{25}$ |
| 19 | P-19 | HOOC—C$_6$H$_3$(COOH)—COO(CH$_2$)$_7$— | —C$_{12}$H$_{25}$ | —CH$_2$—C(CH$_3$)(COOC$_4$H$_9$)— | 60/10/30 | —C$_4$H$_9$ |
| 20 | P-20 | phthalic anhydride—COO(CH$_2$)$_7$— | —CH$_3$ | — | 40/0/60 | —C$_{18}$H$_{37}$ |
| 21 | P-21 | HOCH—CH$_2$—HOCH$_2$ | —C$_4$H$_9$ | —CH$_2$CH(C$_6$H$_5$)— | 35/15/50 | —C$_{22}$H$_{55}$ |
| 22 | P-22 | HO—P(=O)(OH)—O(CH$_2$)$_7$— | —C$_{10}$H$_{21}$ | —CH$_2$—C(CH$_3$)(COOC$_{12}$H$_{25}$)— | 20/50/30 | —CH$_2$CHCH$_2$OCOC$_3$H$_7$ OCOC$_3$H$_7$ |

TABLE 4-continued $$W-S-\left[\left(CH_2-\underset{COOR}{\underset{|}{C}}\right)_{x_1}(X)_{x_2}\left(CH_2-\underset{COO(CH_2)OOC(CH_2)_2S(CH_2-\underset{COOR'}{\underset{|}{C}}\underset{CH_3}{\overset{CH_3}{|}})_z}{\underset{|}{C}}\right)_y\right]$$

($x_1/x_2/y$: weight component ratio)

| Production Example of Resin | Dispersion-Stabilizing Resin | —W | R | X | $x_1/x_2/y$ | R' |
|---|---|---|---|---|---|---|
| 23 | P-23 | $H_5C_2O-\overset{O}{\underset{OH}{\overset{\|}{P}}}-O(CH_2)_{\overline{2}}$ | —$C_5H_{11}$ | — | 40/0/60 | —$C_{16}H_{33}$ |
| 24 | P-24 | N.HO$_3$S(CH$_2$)$_{\overline{2}}$ [pyridinium ring] | —$C_8H_{17}$ | $-CH_2-\underset{COO(CH_2)_2OCOC_{11}H_{23}}{\underset{\|}{\overset{CH_3}{\overset{\|}{C}}}}-$ | 30/30/40 | —$C_{18}H_{37}$ |
| 25 | P-25 | HO(CH$_2$)$_{\overline{2}}$ | —$C_{18}H_{37}$ | $-CH_2-\underset{COO(CH_2)_2N\underset{C_2H_5}{\overset{C_2H_5}{\diagdown}}}{\underset{\|}{\overset{CH_3}{\overset{\|}{C}}}}-$ | 70/10/20 | —$C_4H_9$ |

PRODUCTION EXAMPLES 26 TO 31 OF DISPERSION-STABILIZING RESIN: P-26 TO P-31

By following the same procedure as Production Example of Resin P-1 except that each of the azobis compounds shown in Table 5 below was used in place of the polymerization initiator, A.C.V., each of the resins shown in Table 5 was produced.

The weight average molecular weights of the resins were from $3.0 \times 10^4$ to $6 \times 10^4$.

TABLE 5

R—N=N—R: Azobis Compound

| Production Example of Resin | Dispersion-Stabilizing Resin | R in Azobis Compound |
|---|---|---|
| 26 | P-26 | HO—CH$_2$—C(CH$_3$)(CN)— |
| 27 | P-27 | HO—CH$_2$CH$_2$CH$_2$—C(CH$_3$)(CN)— |
| 28 | P-28 | HOCH$_2$CH$_2$NHCO—C(CH$_3$)(CH$_3$)— |
| 29 | P-29 | 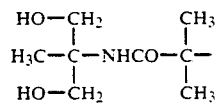 |
| 30 | P-30 | 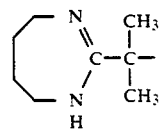 |

TABLE 5-continued

R—N=N—R: Azobis Compound

| Production Example of Resin | Dispersion-Stabilizing Resin | R in Azobis Compound |
|---|---|---|
| 31 | P-31 | 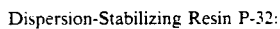 |

PRODUCTION EXAMPLE 32 OF DISPERSION-STABILIZING RESIN: P-32

A mixture of 85 g of n-dodecyl methacrylate, 15 g of Macromonomer M-28, and 150 g of toluene was heated to 75° C. with stirring under nitrogen gas stream and, after adding 1.0 g of A.I.B.N. to the reaction mixture, the reaction was carried out for 4 hours. Then, after adding 0.5 g of A.I.B.N. to the reaction mixture, the reaction was carried out for 3 hours and, after further adding thereto, the reaction was carried out for 2 hours at 90° C. After cooling, the reaction mixture was reprecipitated from 2 liters of methanol, and the viscous product thus precipitated was collected by decantation and dried under reduced pressure to obtain 76 g of the desired resin having a weight average molecular weight of $4.3 \times 10^4$ as a transparent viscous product.

Dispersion-Stabilizing Resin P-32:

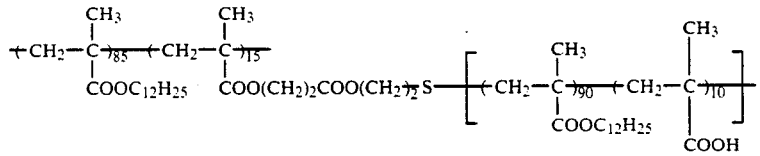

PRODUCTION EXAMPLES 33 TO 42 OF DISPERSION-STABILIZING RESIN: P-33 TO P-42

By following the same procedure as Production Example of Resin P-32 except that each of the mixtures shown in Table 6 below was used in place of n-dodecyl methacrylate and Macromonomer M-28, each of the resins P-33 to P-42 was produced.

The weight average molecular weights of the resins were from $3.5 \times 10^4$ to $4.5 \times 10^4$.

TABLE 6

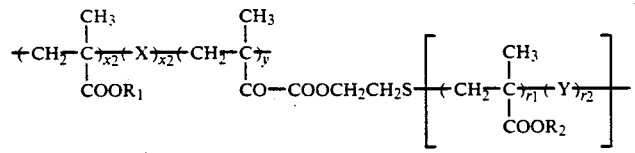

($x_1/x_2y$ and $r_1/r_2$: weight component ratio)

| Production Example of Resin | Dispersion-Stabilizing Resin | R$_1$ | —X— | x$_1$/X$_2$/y | R$_2$ | —Y— | r$_1$/r$_2$ |
|---|---|---|---|---|---|---|---|
| 33 | P-33 | —C$_{18}$H$_{37}$ | — | 90/0/10 | —CH$_3$ | —CH$_2$—C(CH$_3$)(COOCH$_2$CH$_2$OH)— | 85/15 |

TABLE 6-continued $$+CH_2-C(\underset{COOR_1}{\underset{|}{CH_3}})_{\overline{x_1}}+X_{\overline{x_2}}+CH_2-C(\underset{CO-COOCH_2CH_2S}{\underset{|}{CH_3}})_{\overline{y}}+CH_2-C(\underset{COOR_2}{\underset{|}{CH_3}})_{\overline{r_1}}+Y_{\overline{r_2}}$$

($x_1/x_2y$ and $r_1/r_2$: weight component ratio)

| Production Example of Resin | Dispersion Stabilizing Resin | $R_1$ | $-X-$ | $x_1/X_2/y$ | $R_2$ | $-Y-$ | $r_1/r_2$ |
|---|---|---|---|---|---|---|---|
| 34 | P-34 | " | — | 85/0/15 | $-C_4H_9$ | $-CH_2-CH-$<br>  \|<br>  (C$_6$H$_4$)<br>  \|<br>  COOH | 90/10 |
| 35 | P-35 | $-C_{12}H_{25}$ | $-CH_2-C(CH_3)-$<br>  \|<br>  COOH | 55/5/40 | $-C_{12}H_{25}$ | — | 100/0 |
| 36 | P-36 | $-C_{13}H_{27}$ | $-CH_2-CH-$<br>  \|<br>  COO(CH$_2$)$_2$COOH | 65/5/30 | $-C_{18}H_{37}$ | — | 100/0 |
| 37 | P-37 | $-C_{18}H_{37}$ | — | 80/0/20 | $-C_2H_5$ | $-CH_2-C(CH_3)-$<br>  \|<br>  COO(CH$_2$)$_2$Cl | 90/10 |
| 38 | P-38 | $-C_4H_9$ | $-CH_2-C(CH_3)-$<br>  \|<br>  COO(CH$_2$)$_2$OCO<br>  \|<br>  (CH$_2$)$_3$COOH | 35/5/60 | $-C_{16}H_{33}$ | — | 100/0 |
| 39 | P-39 | $-C_{12}H_{25}$ | $-CH_2-C(CH_3)-$<br>  \|<br>  COOCH$_2$CHCH$_2$OCOCH$_3$<br>  \|<br>  OCOCH$_3$ | 60/20/20 | $-C_{12}H_{25}$ | $-CH_2-CH-$<br>  \|<br>  COOH | 95/5 |
| 40 | P-40 | $-C_5H_{11}$ | $-CH_2-C(CH_3)-$<br>  \|<br>  COO(CH$_2$)$_2$OH | 30/10/60 | $-C_{18}H_{37}$ | — | 100/0 |
| 41 | P-41 | $-C_{20}H_{41}$ | — | 80/0/20 | $-C_2H_5$ | $-CH_2-CH-$<br>  \|<br>  CONH$_2$ | 90/10 |
| 42 | P-42 | $-C_{18}H_{37}$ | — | 85/0/H$_{21}$ | $-C_{10}H_{21}$ | $-CH_2-C(CH_3)-$<br>  \|<br>  COO(CH$_2$)$_2$O-P(=O)(OH)$_2$ | 95/5 |

Production Example 1 of Latex Grains: D-1

A mixture of 100 g of vinyl acetate, 12 g of the dispersion-stabilizing resin P-4, and 380 g of Isopar H was heated to 75° C. with stirring under nitrogen gas stream. After adding 0.8 g of A.I.B.N. to the reaction mixture, the reaction was carried out for 4 hours and, after further adding thereto 0.4 g of A.I.B.N., the reaction was carried out for 2 hours. Twenty minutes after the addition of the polymerization initiator, the reaction mixture became white turbid, and the reaction temperature raised to 88° C. In this point, 8 g of the dispersion-stabilizing resin P-4 was added thereto and, after raising the temperature to 100° C, the mixture was stirred for one hour to distil off unreacted vinyl acetate. After cooling, the reaction mixture was passed through a 200 mesh nylon cloth to obtain the desired latex grains having a mean grain size of 0.20 μm with a polymerization ratio of 90% as a white dispersion.

Production Examples 2 to 19 of Latex Grains: D-2 to D-29

By following the same procedure as Production Example 1 of Latex Grains except that each of the compounds shown in Table 7 below was used in place of the dispersion stabilizing resin P-4, each of the latex grains shown in Table 7 below was produced.

The polymerization ratios of the latex grains thus obtained were from 80% to 85%.

TABLE 7

| Production Example of Latex Grains | Latex Grains | Dispersion-Stabilizing Resin Kind | Amount Used (g) | Mean Grain Size of Latex (μm) |
|---|---|---|---|---|
| 2 | D-2 | P-2 | 15 | 0.30 |
| 3 | D-3 | P-5 | 10 | 0.18 |
| 4 | D-4 | P-7 | 14 | 0.25 |
| 5 | D-5 | P-8 | 18 | 0.28 |
| 6 | D-6 | P-9 | 20 | 0.25 |
| 7 | D-7 | P-10 | 16 | 0.23 |
| 8 | D-8 | P-11 | 16 | 0.22 |
| 9 | D-9 | P-12 | 14 | 0.23 |
| 10 | D-10 | P-15 | 14 | 0.26 |
| 11 | D-11 | P-16 | 10 | 0.19 |
| 12 | D-12 | P-26 | 18 | 0.27 |
| 13 | D-13 | P-27 | 20 | 0.25 |
| 14 | D-14 | P-29 | 20 | 0.24 |
| 15 | D-15 | P-33 | 25 | 0.26 |
| 16 | D-16 | P-17 | 12 | 0.19 |
| 17 | D-17 | P-18 | 10 | 0.18 |
| 18 | D-18 | P-19 | 16 | 0.25 |
| 19 | D-19 | P-20 | 20 | 0.26 |
| 20 | D-20 | P-21 | 25 | 0.24 |
| 21 | D-21 | P-22 | 16 | 0.23 |
| 22 | D-22 | P-33 | 18 | 0.26 |
| 23 | D-23 | P-24 | 12 | 0.18 |
| 24 | D-24 | P-30 | 16 | 0.28 |
| 25 | D-25 | P-32 | 14 | 0.22 |
| 26 | D-26 | P-34 | 14 | 0.20 |
| 27 | D-27 | P-35 | 10 | 0.21 |
| 28 | D-28 | P-39 | 12 | 0.19 |
| 29 | D-29 | P-41 | 12 | 0.24 |

PRODUCTION EXAMPLE 30 OF LATEX GRAINS: D-30

A mixture of 100 g of vinyl acetate, 5 g of crotonic acid, 14 g of the dispersion-stabilizing resin P-5, and 468 g of Isopar E was heated to 70° C. with stirring under nitrogen gas stream. Then, 1.3 g of 2,2'-azobis-(isovaleronitrile) (A.I.V.N.) was added to the reaction mixture which was then reacted for 6 hours. The temperature of the system was raised to 100° C., and the mixture was stirred for one hour at the temperature to distil off remaining vinyl acetate. After cooling, the reaction mixture was passed through a 200 mesh nylon cloth to obtain the desired latex grains having a mean grain size of 0.24 μm with a polymerization ratio of 85% as a white dispersion.

PRODUCTION EXAMPLE 31 OF LATEX GRAINS: D-31

A mixture of 14 g of the dispersion-stabilizing resin P-16, 100 g of vinyl acetate, 6.0 g of 4-pentenoic acid, and 380 g of Isopar G was heated to 75° C. with stirring under nitrogen gas stream. Then, after adding 0.7 g of A.I.B.N. to the reaction mixture, the reaction was carried out for 4 hours and, after further adding thereto 0.5 g of A.I.B.N., the reaction was carried out for 2 hours. After cooling, the reaction mixture was passed through a 200 mesh nylon cloth to obtain the desired latex grains having a mean grain size of 0.24 μm as a white dispersion.

PRODUCTION EXAMPLE 32 OF LATEX GRAINS: D-32

A mixture of 85 g of vinyl acetate, 15 g of N-vinylpyrrolidone, 14 g of the dispersion-stabilizing resin P-25, and 380 g of n-decane was heated to 75° C. with stirring under nitrogen gas stream. Then, after adding 1.7 g of A.I.B.N. to the reaction mixture, the reaction was carried out for 4 hours and, after further adding thereto 0.5 g of A.I.B.N., the reaction was carried out for 2 hours. After cooling, the reaction mixture was passed through a 200 mesh nylon cloth to obtain the desired latex grains having a mean grain size of 0.26 μm as a white dispersion.

PRODUCTION EXAMPLE 33 OF LATEX GRAINS: D-33

A mixture of 100 g of methyl methacrylate, 25 g of the dispersion-stabilizing resin P-20, and 470 g of n-decane was heated to 70° C. with stirring under nitrogen gas stream and, after adding 1.0 g of A.I.V.N. to the reaction mixture, the reaction was carried out for 2 hours. Few minutes after the addition of the polymerization initiator, the mixture began to become blue-white turbid, and the reaction temperature raised to 90° C. After cooling, the reaction mixture was passed through a 200 mesh nylon cloth to remove coarse grains, whereby the desired latex grains having a mean grain size of 0.35 μm were obtained as a white dispersion.

PRODUCTION EXAMPLE 34 OF LATEX GRAINS: D-34

A mixture of 100 g of styrene, 14 g of the dispersion-stabilizing resin P-8, and 380 g of Isopar H was heated to 60° C. with stirring under nitrogen gas stream. Then, after adding 0.6 g of A.I.V.N. to the reaction mixture, the reaction was carried out for 4 hours and, after further adding thereto 0.3 g of A.I.V.N., the reaction was carried out for 3 hours. After cooling, the reaction mixture was passed through a 200 mesh nylon cloth to obtain the desired latex grain having a mean grain size of about 0.20 μm as a white dispersion.

PRODUCTION EXAMPLE 35 OF LATEX GRAINS: (COMPARISON EXAMPLE A-1)

By following the same procedure as Production Example 1 of Latex Grains D-1 except that 20 g of poly(octadecyl methacrylate) was used in place of the dispersion-stabilizing resin P-4 (12 g) and the post-added dispersion-stabilizing resin P-4 (8 g), latex grains having a mean grain size of 0.25 μm were obtained with a polymerization ratio of 85% as a white dispersion.

PRODUCTION EXAMPLE 36 OF LATEX GRAINS: (COMPARISON EXAMPLE B-1)

By following the same procedure as Production Example 1 of Latex Grains D-1 using a mixture of 20 g of poly(octadecyl methacrylate) 100 g of vinyl acetate, 1.0 g of octadecyl methacrylate, and 385 g of Isopar H, latex grains having a mean grain size of 0.20 μm were obtained with a polymerization ratio of 85% as a white dispersion. (Latex grains described in JP-A-60-179751)

PRODUCTION EXAMPLE 37 OF LATEX GRAINS: (COMPARISON EXAMPLE C-1)

By following the same procedure as Production Example 1 of Latex Grains D-1 using a mixture of 20 g of poly(octadecyl methacrylate) 100 g of vinyl acetate, 1 g of Monomer (I) having the chemical structure shown below, and 385 g of Isopar H, latex grains having a mean grain size of 0.24 μm were obtained with a polymerization ratio of 86% as a white dispersion. (Latex grains described in JP-A-62-151868)

Monomer (I):

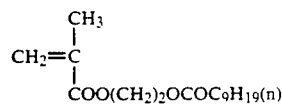

PRODUCTION EXAMPLE 38 OF LATEX GRAINS: D-38

A mixture of 10 g of the dispersion-stabilizing resin P-4, 100 g of vinyl acetate, 1.0 g of octadecyl methacrylate, and 384 g of Isopar H was heated to 70° C. with stirring under nitrogen gas stream and, after adding 0.8 g of A.I.V.N. to the reaction mixture, the reaction was carried out for 6 hours. Twenty minutes after the addition of the polymerization initiator, the mixture became white turbid and the reaction temperature raised to 88° C. Then, the mixture was stirred for 2 hours at 100° C. to distill off the unreacted vinyl acetate. After cooling, the reaction mixture was passed through a 200 mesh nylon cloth to obtain the desired latex grain having a mean grain size of 0.24 μm with a polymerization ratio of 90% as a white dispersion.

PRODUCTION EXAMPLE 39 TO 49 OF LATEX GRAINS: D-39 TO D-49

By following the same procedure as Production Example 38 of latex grains except that each of the dispersion-stabilizing resins shown in Table 8 below was used in place of the dispersion-stabilizing resin P-4, each of latex grains D-39 to D-49 was produced.

TABLE 8

| Production Example of Latex Grains | Latex Grain | Dispersion-Stabilizing Resin | Polymerization Ratio (%) | Mean Grain Size (μm) |
|---|---|---|---|---|
| 39 | D-39 | P-2 | 88 | 0.25 |
| 40 | D-40 | P-3 | 89 | 0.24 |
| 41 | D-41 | P-1 | 87 | 0.26 |
| 42 | D-42 | P-5 | 90 | 0.24 |
| 43 | D-43 | P-6 | 85 | 0.23 |
| 44 | D-44 | P-7 | 86 | 0.25 |
| 45 | D-45 | P-8 | 85 | 0.23 |
| 46 | D-46 | P-9 | 88 | 0.24 |
| 47 | D-47 | P-12 | 83 | 0.22 |
| 48 | D-48 | P-15 | 86 | 0.28 |
| 49 | D-49 | P-24 | 86 | 0.22 |

PRODUCTION EXAMPLES 50 TO 55 OF LATEX GRAINS: D-50 TO D-55

By following the same procedure as Production Example 38 of latex grains except that 1 g of each of the monomers shown in Table 9 below was used in place of 1 g of octadecyl methacrylate, each of the latex grains shown in Table 9 was produced.

TABLE 9

| Production Example of Latex Grains | Latex Grains | Monomer | Polymerization Ratio (%) | Mean Grain Size (μm) |
|---|---|---|---|---|
| 50 | D-50 | Docosanyl Methacrylate | 87 | 0.23 |
| 51 | D-51 | Hexadecyl Methacrylate | 87 | 0.24 |
| 52 | D-52 | Tetradecyl Methacrylate | 88 | 0.24 |
| 53 | D-53 | Tridecyl methacrylate | 86 | 0.24 |
| 54 | D-54 | Dodecyl Methacrylate | 86 | 0.23 |
| 55 | D-55 | Decyl Methacrylate | 87 | 0.26 |

PRODUCTION EXAMPLE 56 OF LATEX GRAINS: D-56

A mixture of 6 g of the dispersion-stabilizing resin P-10, 8 g of poly(octadecyl methacrylate), 100 g of vinyl acetate, 0.8 g of dodecyl methacrylate, and 400 g of Isopar H was heated to 75° C. with stirring under nitrogen gas stream. After adding 0.7 g of A.I.B.N. to the reaction mixture, the reaction was carried out for 4 hours and, after further adding thereto 0.5 g of A.I.B.N., the reaction was carried out for 2 hours. After cooling, the reaction mixture was passed through a 200 mesh nylon cloth to obtain the desired latex grains having a mean grain size of 0.20 μm as a white dispersion.

PRODUCTION EXAMPLE 57 OF LATEX GRAINS: D-57

A mixture of 10 g of the dispersion-stabilizing resin P-25, 90 g of vinyl acetate, 10 g of N-vinylpyrrolidone, 1.5 g of octadecyl methacrylate, and 400 g of isododecane was heated to 65° C. with stirring under nitrogen gas stream and, after adding 1.5 g of A.I.B.N. to the reaction mixture, the reaction was carried out for 4 hours. After cooling, the reaction mixture was passed through a 200 mesh nylon cloth to obtain the desired latex grains having a mean grain size of 0.25 μm as a white dispersion.

PRODUCTION EXAMPLE 58 OF LATEX GRAINS: D-58

A mixture of 20 g of the dispersion-stabilizing resin P-10, 94 g of vinyl acetate, 6 g of crotonic acid, 2 g of hexadecyl methacrylate, and 538 g of Isopar G was heated to 60° C. with stirring under nitrogen gas stream. After adding 1.0 g of A.I.V.N. to the reaction mixture, the reaction was carried out for 2 hours and, after further adding thereto 0.5 g of A.I.V.N., the reaction was carried out for 2 hours. After cooling, the reaction mixture was passed through a 200 mesh nylon cloth to obtain the desired latex grains having a mean grain size of 0.24 μm to obtain the desired latex grains having a mean grain size of 0.24 μm as a white dispersion.

PRODUCTION EXAMPLE 59 OF LATEX GRAINS: D-59

A mixture of 25 g of the dispersion-stabilizing resin P-1, 100 g of methyl methacrylate, 2 g of decyl methacrylate, 0.8 g of n-dodecylmercaptane, and 378 g of Isopar H was heated to 60° C. with stirring under nitrogen gas stream and, after adding 0.7 g of A.I.V.N. to the reaction mixture, the reaction was carried out for 4 hours. After cooling, the reaction mixture was passed through a 200 mesh nylon cloth to obtain the desired latex grains having a mean grain size of 0.25 μm as a white dispersion.

PRODUCTION EXAMPLE 60 OF LATEX GRAINS: D-60

A mixture of 25 g of the dispersion-stabilizing resin P-34, 100 g of styrene, 2 g of octadecyl vinyl ether, and 380 g of Isopar H was heated to 45° C. with stirring under nitrogen gas stream and, after adding 1.0 g (a solid content as n-butyl lithium) of a hexane solution of n-butyl lithium to the reaction mixture, the reaction was carried out for 4 hours. After cooling, the reaction mixture was passed through a 200 mesh nylon cloth to obtain the desired latex grains having a mean grain size of 0.27 μm as a white dispersion.

PRODUCTION EXAMPLE 61 OF LATEX GRAINS: (COMPARISON EXAMPLE A-2)

By following the same procedure as production Example 38 of latex grains using a mixture of 20 g of poly-(octadecyl methacrylate) (Dispersion-Stabilizing Resin R-1), 100 g of vinyl acetate, 1 g of octadecyl methacrylate, and 380 g of Isopar H, latex grains having a mean grain size of 0.27 were obtained with a polymerization ratio of 88% as a white dispersion. (Latex grains described in JP-A-60-17951)

PRODUCTION EXAMPLE 62 OF LATEX GRAINS: (COMPARISON EXAMPLE B-2)

A mixture of 97 g of octadecyl methacrylate, 3 g of acrylic acid, and 200 g of toluene was heated to 75° C. with stirring under nitrogen gas stream and, after adding 1.0 g of A.I.B.N. to the reaction mixture, the reaction was carried out for 8 hours. Then, 12 g of glycidyl methacrylate, 1.0 g of t-butylhydroquinone, and 1.2 g of N,N-dimethyldodecylamine were added to the reaction mixture, and the resulting mixture was stirred for 40 hours at 100° C. After cooling, the reaction mixture was reprecipitated from 2 liters of methanol, and the white powder formed was collected by filtration and dried to provide 84 g of a dispersion-stabilizing resin R-2 having the following structure. The weight average molecular weight thereof was 35,000.

Dispersion-Stabilizing Resin R-2:

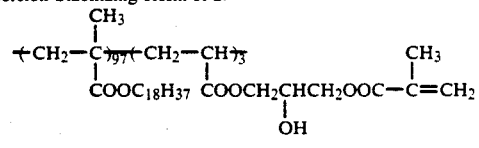

(weight composition ratio)

Then, by following the same procedure as in Production Example 38 of latex grains using a mixture of 10 g of the dispersion-stabilizing resin R-2, 100 g of vinyl acetate, 1.0 g of octadecyl methacrylate, and 384 g of Isopar H, latex grains having a mean grain size of 0.15 μm were obtained with a polymerization ratio of 89% as a white dispersion. (Latex grains described in JP-A-61-63855).

PRODUCTION EXAMPLE 63 OF LATEX GRAINS: (COMPARISON Example C-2)

By following the same procedure as Production Example 38 of latex grain using a mixture of 12 g of a dispersion-stabilizing resin R-3 having the structure shown below, which was produced by the method described in JP-A-60-185963, 100 g of vinyl acetate, 1.0 g of octadecyl methacrylate, and 382 g of Isopar H, latex grains having a mean grain size of 0.23 μm were obtained with a polymerization ratio of 87% as a white dispersion. (Latex grains described in JP-A-60-185963).

Dispersion-Stabilizing Resin R-3:

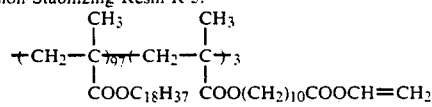

(weight composition ratio)
Weight average molecualr weight: 46,000

PRODUCTION EXAMPLE 64 OF LATEX GRAINS: D-64

A mixture of 16 g of the dispersion-stabilizing resin P-64, 100 g of vinyl acetate, 1.5 g of Compound IV-2-19 as Monomer (B-2), and 384 g of Isopar H was heated to 70° C. with stirring under nitrogen gas stream and, after adding 0.8 g of A.I.V.N. to the reaction mixture, the reaction was carried out for 6 hours. Twenty minutes after the addition of the polymerization initiator, the mixture became white turbid, and the reaction temperature raised to 88° C. The reaction mixture was then stirred for 2 hours at 100° C. to distill off the unreacted vinyl acetate. After cooling, the reaction mixture was passed through a 200 mesh nylon cloth to obtain the desired latex grains having a mean grain size of 0.20 μm with a polymerization ratio of 85% as a white dispersion.

PRODUCTION EXAMPLES 65 TO 85 OF LATEX GRAINS: D-65 to D-85

By following the same procedure as Production Example 64 of latex grains except that each of the dispersion-stabilizing resins and each of the monomers (B-2) shown in Table 10 below were used in place of the dispersion-stabilizing resin P-4 and Compound IV-2-19 as Monomer (B-2), respectively, each of the latex grains was produced. The polymerization ratios of the resulting grains were from 85% to 90%.

TABLE 10

| Production Example of Latex | Latex Grain | Dispersion-Stabilizing Resin | Monomer (B-2) | Mean Grain Size of Latex (μm) |
|---|---|---|---|---|
| 65 | D-65 | P-1 | IV-2-1 | 0.19 |
| 66 | D-66 | " | IV-2-2 | 0.19 |
| 67 | D-67 | " | IV-2-3 | 0.20 |
| 68 | D-68 | " | IV-2-8 | 0.22 |

TABLE 10-continued

| Production Example of Latex | Latex Grain | Dispersion-Stabilizing Resin | Monomer (B-2) | Mean Grain Size of Latex (μm) |
|---|---|---|---|---|
| 69 | D-69 | " | IV-2-9 | 0.22 |
| 70 | D-70 | " | IV-2-10 | 0.20 |
| 71 | D-71 | " | IV-2-11 | 0.18 |
| 72 | D-72 | " | IV-2-14 | 0.17 |
| 73 | D-73 | " | IV-2-18 | 0.21 |
| 74 | D-74 | P-2 | IV-2-10 | 0.19 |
| 75 | D-75 | P-3 | IV-2-19 | 0.20 |
| 76 | D-76 | P-4 | IV-2-20 | 0.22 |
| 77 | D-77 | P-5 | IV-2-21 | 0.22 |
| 78 | D-78 | P-10 | IV-2-22 | 0.23 |
| 79 | D-79 | P-12 | IV-2-23 | 0.23 |
| 80 | D-80 | P-15 | IV-2-24 | 0.22 |
| 81 | D-81 | P-16 | IV-2-15 | 0.23 |
| 82 | D-82 | P-17 | IV-2-16 | 0.18 |
| 83 | D-83 | P-23 | IV-2-26 | 0.19 |
| 84 | D-84 | P-24 | IV-2-27 | 0.20 |
| 85 | D-85 | P-26 | IV-2-29 | 0.21 |

PRODUCTION EXAMPLE 86 OF LATEX GRAINS: D-86

A mixture of 8 g (as solid component) of the dispersion-stabilizing resin P-25, 7 g of poly(dodecyl methacrylate), 100 g of vinyl acetate, 1.5 g of Compound IV-2-15 as Monomer (B-2), and 380 g of n-decane was heated to 75° C. with stirring under nitrogen gas stream. After adding 1.0 g of A.I.B.N. to the reaction mixture, the reaction was carried out for 4 hours and, after further adding thereto 0.5 g of A.I.B.N., the reaction was carried out for 2 hours. The reaction mixture was further stirred for 2 hours at 110° C. to distill off the low-boiling solvent and remaining vinyl acetate. After cooling, the reaction mixture was passed through a 200 mesh nylon cloth to obtain the desired latex grains having a mean grain size of 0.20 μm as a white dispersion.

PRODUCTION EXAMPLE 87 OF LATEX GRAINS: D-87

A mixture of 14 g of the dispersion-stabilizing resin P-25, 85 g of vinyl acetate, 2.0 g of Compound IV-2-23 as Monomer (B-2), 15 g of N-vinylpyrrolidone, and 400 g of isododecane was heated to 65° C. with stirring under nitrogen gas stream and, after adding 1.5 g of A.I.B.N. to the reaction mixture, the reaction was carried out for 4 hours. After cooling, the reaction mixture was passed through a 200 mesh nylon cloth to obtain the desired latex grains having a mean grain size of 0.26 μm as a white dispersion.

PRODUCTION EXAMPLE 88 OF LATEX GRAINS: D-88

A mixture of 14 g of the dispersion-stabilizing resin P-32, 100 g of vinyl acetate, 1.5 g of Compound IV-2-18 as Monomer (B-2), 5 g of 4-pentenoic acid, and 383 g of Isopar G was heated to 60° C. with stirring under nitrogen gas stream. After adding 1.0 g of A.I.V.N. to the reaction mixture, the reaction was carried out for 2 hours and, after further adding thereto 0.5 g of A.I.V.N., the reaction was carried out for 2 hours. After cooling, the reaction mixture was passed through a 200 mesh nylon cloth to obtain the desired latex grains having a mean grain size of 0.25 μm as a white dispersion.

PRODUCTION EXAMPLE 89 OF LATEX GRAINS: D-89

A mixture of 20 g of the dispersion-stabilizing resin P-1, 2 g of Compound IV-2-16 as Monomer (B-2), 1 g of n-dodecylmercaptane, 100 g of methyl methacrylate, and 478 g of Isopar H was heated to 65° C. with stirring under nitrogen gas stream and, after adding 1.2 g of A.I.V.N. to the reaction mixture, the reaction was carried out for 4 hours. After cooling, the reaction mixture was passed through a 200 mesh nylon cloth to remove coarse grains, whereby the desired latex grains having a mean grain size of 0.28 μm were obtained as a white dispersion.

PRODUCTION EXAMPLE 90 OF LATEX GRAINS: D-90

A mixture of 20 g of the dispersion-stabilizing resin P-18, 100 g of styrene, 4 g of Compound IV-2-25 as Monomer (B-2), and 380 g of Isopar H was heated to 50° C. with stirring under nitrogen gas stream and, after adding 1.0 g (as solid component) of a hexane solution of n-butyl lithium to the reaction mixture, the reaction was carried out for 4 hours. After cooling, the reaction mixture was passed through a 200 mesh nylon cloth to obtain the desired latex grains having a mean grain size of 0.25 μm as a white dispersion.

PRODUCTION EXAMPLE 91 OF LATEX GRAINS: (COMPARISON Example A-3)

By following the same procedure as Production Example 64 of latex grains using a mixture of 20 g of poly(octadecyl methacrylate) having a weight average molecular weight of 35,000, 100 g of vinyl acetate, 1.5 g of Compound IV-2-19 as Monomer (B-2), and 380 g of Isopar H, latex grains having a mean grain size of 0.23 μm were obtained with a polymerization ratio of 88% as a white dispersion. (Latex grains described in JP-A-62-151868)

PRODUCTION EXAMPLE 92 OF LATEX GRAINS: (COMPARISON Example B-3)

By following the same procedure as Production Example 64 of latex grains using a mixture of 14 g of a dispersion-stabilizing resin having the chemical structure shown below, 100 g of vinyl acetate, 1.5 g of Compound IV-2-19 as Monomer (B-2), and 386 g of Isopar H, latex grains having a mean grain size of 0.25 μm were obtained with a polymerization ratio of 90% as a white dispersion. (Latex grains described in JP-A-63-66567)

Dispersion-Stabilizing Resin:

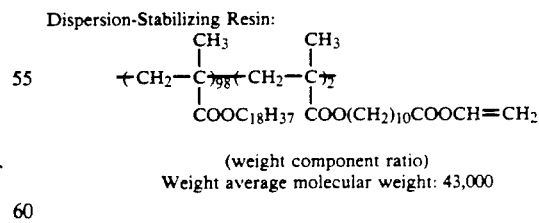

(weight component ratio)
Weight average molecular weight: 43,000

EXAMPLE 1

In a paint shaker (manufactured by Tokyo Seiki K. K.) were placed 10 g of a dodecyl methacrylate/acrylic acid copolymer (95/5 by weight ratio), 10 g of nigrosine, and 30 g of shellsol 71 together with glass beads followed by dispersing to prepare a fine dispersion of nigrosine.

Then, a liquid developer for electrostatic photography was prepared by diluting 30 g of the resin dispersion D-1 obtained in Production Example 1 of latex grains, 2.5 g of the aforesaid nigrosine dispersion, 15 g of FOC-1400 (trade name of tetradecyl alcohol, made by Nissan Chemical Industries, Ltd.), and 0.08 g of a copolymer of Octadecene and semi-maleic octadecylamide with one liter of Shellsol 71.

COMPARISON PRODUCTION LIQUID DEVELOPERS A-1, B-1, and C-1

Three kinds of comparison developers A-1, B-1, and C-1 were prepared in the same manner as above except that each of the resin dispersions shown below was used in place of the aforesaid resin dispersion.

Comparison Liquid Developer A-1

The resin dispersion obtained in Production Example 35 of latex grains was used.

Comparison Liquid Developer B-1

The resin dispersion obtained in Production Example 36 of latex grains was used.

Comparison Liquid Developer C-1

The resin dispersion obtained in Production Example 37 of latex grains was used.

An electrophotographic light-sensitive material, ELP Master II Type (trade name, made by Fuji Photo Film, Co., Ltd.) was image-exposed and developed by a full-automatic processor, ELP 404V (trade name, made by Fuji Photo Film Co., Ltd.) using each of the liquid developers thus prepared. The processing (plate-making) speed was 5 plates/minute. Furthermore, after processing 2,000 plates of ELP Master II Type, the occurrence of stains of the developing apparatus by adhesion of the toner was observed. The blackened ratio (imaged area) of the duplicated images was determined using 20% original. The results obtained are shown in Table 11 below.

nied by the aforesaid failures, while the master plate prepared using the comparison liquid B-1 caused the failures after making 7,000 plates, and the master plate obtained using the comparison liquid developer C-1 caused the failures after making 9,000 plates.

As is clear from the aforesaid results, only the liquid developer according to the present invention could give a greatly increased number of printing master plates without causing stains of the developing apparatus.

That is, in the case of the comparison liquid developer A-1, there was no problem on the number of printing plates obtained, but the developing apparatus was too stained to further use in succession.

Also, in the cases of using each of the comparison liquid developer B-1 and the comparison liquid developer C-1, the developing apparatus (in particular, the back electrode) was stained when the developer was used under the condition of a rapid processing speed of 5 plates/minutes (an ordinary processing speed was 2 or 3 plates/minutes) and, after making 2,000 plates, the image quality of the duplicated images on the plate was reduced (the reduction of $D_{max}$, lowering of the density of fine lines, etc. The number of prints by the master plate in the case of using the comparison liquid developer C-1 was 10% or less as compared with the case of using the liquid developer of this invention, and the number of prints in the case of using the comparison liquid developer B-1 was 30% or less as compared with the case of using the liquid developer of this invention.

These results show that the resin grains of this invention are clearly excellent.

EXAMPLE 2

A mixture of 100 g of the white dispersion obtained in Production Example 2 of latex grains and 1.5 g of Sumikalon Black was heated to 100° C. with stirring for 4 hours. After cooling to room temperature, the reaction mixture was passed through a 200 mesh nylon cloth to remove the remaining dye to obtain a black resin dispersion having a mean grain size of 0.25 μm.

TABLE 11

| Test No. | Liquid Developer | Stains of Developing Apparatus | Image of the 2,000th Plate | Printing Durability (Number of Plates) |
|---|---|---|---|---|
| 1 | Developer of Invention | No toner residue adhered | Clear | 10,000 or more |
| 2 | Comparison Developer A-1 | Toner residue greatly adhered | Letter lost, solid black part hazed. Background fogged. | 10,000 or more |
| 3 | Comparison Developer B-1 | Toner residue slightly adhered | Fine lines slightly hazed. $D_{max}$ decreased. | 7,000 |
| 4 | Comparison Developer C-1 | Toner residue slightly adhered | Fine lines slightly hazed. $D_{max}$ decreased. | 9,000 |

As is clear from the results shown above, when printing plates were produced by the aforesaid processing condition using each liquid developer, the liquid developer which caused no stains of the developing apparatus and gave clear image on the 2,000th plate was the liquid developer only of this invention.

Then, the offset printing master plate (ELP master) prepared by processing using each of the liquid developers was used for printing in a conventional manner, and the number of prints obtained before occurrence of defects of letters on the images of the print, the lowering of the density of the solid black portions of the images, etc., was checked. The results showed that the master plate obtained by using each of the liquid developer of this invention and the comparison liquid developer A-1 gave 10,000 prints or more without accompa- Then, a liquid developer was prepared by diluting 32 g of the aforesaid black resin dispersion, 20 g of FOC-1600 (trade name of hexadecyl alcohol, made by Nissan Chemical Industries, Ltd.), and 0.05 g of zirconium naphthenate with one liter of Shellsol 71.

When the liquid developer was applied to the same developing apparatus as used in Example 1, no occurrence of stains of the developing apparatus by sticking of the toner was observed even after developing 2,000 plates.

Also, the quality of the offset printing master plate was clear, and the image quality of the 10,000th plate was very clear.

EXAMPLE 3

A mixture of 100 g of the white dispersion obtained in Production Example 31 of latex grains and 3 g of Victoria Blue B was heated to a temperature of from 70° C. to 80° C. with stirring for 6 hours. After cooling to room temperature, the reaction mixture was passed through a 200 mesh nylon cloth to remove the remaining dye to obtain a blue resin dispersion having a mean grain size of 0.25 μm.

Then, a liquid developer was prepared by diluting 32 g of the aforesaid blue resin dispersion and 0.05 g of zirconium naphthenate with one liter of Isopar H.

When the liquid developer was applied to the same developing apparatus as used in Example 1, no occurrence of stains of the developing apparatus by sticking of the toner was observed even after developing 2,000 plates. Also, the image quality of the offset printing master plate obtained was clear, and the image quality of the 10,000th print obtained using the printing plate was very clear.

EXAMPLE 4

A liquid developer was prepared by diluting 32 g of the white resin dispersion obtained in Production Example 2 of latex grains, 2.5 g of the nigrosine dispersion obtained in Example 1, 15 g of FOC-1800 (trade name of octadecyl alcohol, made by Nissan Chemical Industries, Ltd.), and 0.02 g of a semidocosanylamidated product of a copolymer of diisobutylene and maleic anhydride with one liter of Isopar G.

When the liquid developer was applied to the same developing apparatus as in Example 1, no occurrence of stains of the developing apparatus by sticking of the toner was observed even after developing 2,000 plates. Also, the image quality of the offset printing master plate obtained and the image quality of the 10,000th print obtained using the master plate were very clear.

Furthermore, when the same processing as above was applied after allowing to stand the liquid developer for 3 months, the results were the same as above.

EXAMPLE 5

In a paint shaker were placed 10 g of poly(decyl methacrylate), 30 g of Isopar H, and 8 g of Alkali Blue together with glass beads followed by dispersing for 2 hours to prepare a fine dispersion of Alkali Blue.

Then, a liquid developer was prepared by diluting 30 g of the white resin dispersion D-3 obtained in Production Example 3 of latex grains, 4.2 g of the aforesaid Alkali Blue dispersion, and 0.06 g of a semidocosanylamidated product of a copolymer of diisobutylene and maleic anhydride with one liter of Isopar H.

When the liquid developer was applied to the same developing apparatus as used in Example 1, no occurrence of stains of the developing apparatus by sticking of the toner was observed. Also, the image quality of the offset printing plate obtained and the image quality of the 10,000th print obtained using the master plate were very clear.

EXAMPLES 6 TO 27

Each of liquid developers was prepared by following the same procedure as Example 5 except that each of the latexes shown in Table 12 below was used in place of the white resin dispersion D-3 used in Example 5.

TABLE 12

| Example | Latex Grains |
|---|---|
| 6 | D-4 |
| 7 | D-5 |
| 8 | D-6 |
| 9 | D-7 |
| 10 | D-8 |
| 11 | D-9 |
| 12 | D-10 |
| 13 | D-11 |
| 14 | D-13 |
| 15 | D-14 |
| 16 | D-15 |
| 17 | D-16 |
| 18 | D-17 |
| 19 | D-18 |
| 20 | D-20 |
| 21 | D-21 |
| 22 | D-22 |
| 23 | D-23 |
| 24 | D-25 |
| 25 | D-26 |
| 26 | D-27 |
| 27 | D-28 |

When each of the liquid developers was applied to the same developing apparatus as used in Example 1, no occurrence of stains of the developing apparatus by sticking of the toner was observed even after developing 2,000 plates. Also, the image quality of the offset printing master plates obtained and the image quality of the 10,000th print obtained using each of the master plates were very clear.

Furthermore, when the same processing as above was applied after allowing to stand each liquid developer for 3 months, the results were the same as above.

EXAMPLE 28

In a paint shaker (manufactured by Tokyo Seiki K. K.) were placed 10 g of a dodecyl methacrylate/acrylic acid copolymer (95/5 by weight ratio), 10 g of nigrosine, and 30 g of Isopar G together with glass beads followed by dispersing for 4 hours to prepare a fine dispersion of nigrosine.

Then, a liquid developer was prepared by diluting 30 g of the resin dispersion obtained in Production Example 38 of latex grains, 2.5 g of the aforesaid nigrosine dispersion, 0.07 g of a copolymer of octadecene and semi-maleic octadecylamide, and 15 g of a higher alcohol, FOC-1600 (trade name, made by Nissan Chemical Industries, Ltd.) with one liter of Isopar G.

Comparison Liquid Develocers A-2, B-2, and C-2

Three kinds of liquid developers A-2, B 2, and C-2 were prepared using the following resin dispersions in the aforesaid production method.

Comparison Liquid Developer A-2

The resin dispersion obtained in Production Example 61 of latex grains was used.

Comparison Liquid Developer B-2

The resin dispersion obtained in Production Example 62 of latex grains was used.

Comparison Liquid Developer C-2

The resin dispersion obtained in Production Example 63 of latex grains was used.

An electrophotographic light-sensitive material, ELP Master II Type (trade name, made by Fuji Photo Film Co., Ltd.) was image exposed and developed by a full-automatic processor, ELP 404V (trade name, made by Fuji Photo Film Co., Ltd.) using each of the liquid developers. The processing speed (plate making speed) was 7 plates per minute. Furthermore, the occurrence of stains of the developing apparatus by sticking of the toner after processing 3,000 ELP Master II Type plates was checked. The blackened ratio (imaged area) of the duplicated image was determined using 30% original.

The results obtained are shown in Table 13 below.

TABLE 13

| Test No. | Liquid Developer | Stains of Developing Apparatus | Image of the 3,000th Plate |
| --- | --- | --- | --- |
| 1 | Developer of invention | No stain occurred | Clear |
| 2 | Comparison Developer A-2 | Toner residue greatly adhered. | Letter lost, solid part hazed, background fogged. |
| 3 | Comparison Developer B-2 | Toner residue slightly adhered | Density of solid part of imaged portion lowered, solid black part partially hazed. |
| 4 | Comparison Developer C-2 | Toner residue slightly adhered | Clear |

As is clear from the above results, when each of the liquid developers was used for making printing plates under the aforesaid severe plate-making condition of very fast plate-making speed, only the liquid developer according to the present invention could provide the 3,000th plate having clear images without staining the developing apparatus.

Then, the offset printing master plate (ELP master) prepared by processing using each of the liquid developers was used for printing in a conventional manner, and the number of prints obtained before occurrences of defects of letters on the images of the print, the lowering of the density of the solid black portions of the images, etc., was checked. The results showed that the master plate obtained using each of the liquid developer of this invention and the comparison liquid developers A-2, B-2, and C-2 gave more than 10,000 prints without accompanied by the aforesaid failures.

As described above, only the liquid developer according to the present invention could advantageously be used for preparing a large number of printing master plates without staining the developing apparatus.

That is, in the cases of using the comparison liquid developers A-2, B-2, and C-2, there was no problem on the number of prints but the developing apparatus was too stained to be further used in succession.

Also, in the case of using the comparison liquid developers B-2 and C-2, staining of the developing apparatus was greatly reduced as compared to the case of using the comparison liquid developer A-2 but the improvement was not satisfactory when the developing condition became severe.

That is, the known dispersion-stabilizing resin R-2 used for the comparison liquid developer B-2 has a feature that the resin is a random copolymer containing the monomer (A) (vinyl acetate in the examples) and a component having a polymerizable double bond group copolymerizing with the monomer (A), wherein the polymerizable double bond group exists in a portion near the polymer main chain, thereby the resin is considered to be inferior in the re-dispersibility of late grains as compared with the dispersion-stabilizing resin of this invention.

Also, the known dispersion-stabilizing resin R-3 used for the comparison liquid developer C-2 has a chemical structure that the total sum of the atoms of the linkage group which links the polymerizable double bond group in the resin, which is copolymerized with the monomer (A), to the polymer main chain of the resin is at least 9 and further as compared to that the polymerizable double bond group in the comparison liquid developer B-2 has a structure of

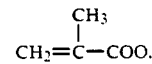

the structure of the polymerizable double bond group the comparison liquid developer C-2 is $CH_2=CH-OCO-$ and has preferably good reactivity with vinyl acetate (monomer (A)). Thus, in the case of using the comparison liquid developer C-2, the images of the 3,000th printing plates was clear and was greatly improved as compared with the case of using the comparison liquid developer B-2. However, in the case of using the comparison liquid developer C-2, the developing apparatus is yet stained by sticking of the toner when the developing condition becomes severe.

EXAMPLE 29

A mixture of 100 g of the white resin dispersion obtained in Production Example 38 of latex grains and 1.5 g of Sumikalon Black was stirred for 4 hours at 100° C. After cooling to room temperature, the reaction mixture was passed through a 200 mesh nylon cloth to remove the remaining dye to obtain a black resin dispersion having a mean grain size of 0.25 μm was obtained.

Then, a liquid developer was prepared by diluting 30 g of the aforesaid black resin dispersion, 0.05 g of zirconium naphthenate, and 20 g of FOC-1600 (trade name, made by Nissan Chemical Industries, Ltd.) with one liter of Shellsol 71.

When the liquid developer was applied to the same developing apparatus as in Example 28, no occurrence of stains of the developing apparatus by sticking of the toner was observed even after developing 3,000 plates.

Also, the image quality of the offset printing master plate obtained was clear, and the image quality of the 10,000th print was very clear.

EXAMPLE 30

A mixture of 100 g of the white resin dispersion obtained in Production Example 58 of latex grains and 3 g of Victoria Blue was stirred for 6 hours at temperature of from 70° C. to 80° C. After cooling to room temperature, the reaction mixture was passed through a 200 mesh nylon cloth to remove the remaining dye to obtain a blue resin dispersion having a mean grain size of 0.25 μm was obtained.

Then, a liquid developer was prepared by diluting 32 g of the aforesaid blue resin dispersion, 0.05 g of zirconium naphthenate, and 15 g of a higher alcohol, FOC-1400 (trade name, made by Nissan Chemical Industries, Ltd.) with one liter of Isopar H.

When the liquid developer was applied to the developing apparatus as in Example 28, no occurrence of stains of the developing apparatus by sticking of the toner was observed even after developing 3,000 plates.

Also, the image quality of the offset printing master plate obtained was clear, and the image quality of the 10,000th print was very clear.

Furthermore, when after allowing the liquid developer to stand for 3 months, the same processing was performed using the liquid developer, the results were same as above.

EXAMPLE 31

In a paint shaker were placed 10 g of poly(decyl methacrylate), 30 g of Isopar H, and 8 g of Alkali Blue together with glass beads followed by dispersing for 2 hours to prepare a fine dispersion of Alkali Blue.

Then a liquid developer was prepared by diluting 30 g of the white resin dispersion obtained in Production Example 38 of latex grains, 4.2 g of the aforesaid Alkali Blue dispersion, 15 g of a higher alcohol, FOC-1400 (trade name, made by Nissan chemical Industries, Ltd.), and 0.06 g of a semidocosanylamidated product of a copolymer of isobutylene and maleic anhydride with one liter of Isopar G.

When the liquid developer was applied to the same developing apparatus as in Example 28, no occurrence of stains of the developing apparatus by sticking of the toner was observed even after developing 3,000 plates. Also, the image quality of the offset printing master plate obtained and the image quality of the 10,000th print were very clear.

EXAMPLES 32 TO 48

Each of liquid developers was prepared by following the same procedure as Example 31 except that 6.0 g (as solid component) of each of the latex grains shown in Table 14 below was used in place of the white resin dispersion obtained in Production Example 38 of latex grains.

TABLE 14

| Example No. | Latex Grains | Stains of Developing Apparatus | Image of the 3,000th Plate |
|---|---|---|---|
| 32 | D-37 | No stains | Clear |
| 33 | D-40 | " | " |
| 34 | D-41 | " | " |
| 35 | D-42 | " | " |
| 36 | D-43 | " | " |
| 37 | D-44 | " | " |
| 38 | D-45 | " | " |
| 39 | D-46 | " | " |
| 40 | D-47 | " | " |
| 41 | D-48 | " | " |
| 42 | D-49 | " | " |
| 43 | D-50 | " | " |
| 44 | D-51 | " | " |
| 45 | D-52 | " | " |
| 46 | D-53 | " | " |

TABLE 14-continued

| Example No. | Latex Grains | Stains of Developing Apparatus | Image of the 3,000th Plate |
|---|---|---|---|
| 47 | D-54 | " | " |
| 48 | D-55 | " | " |

When each of the liquid developers was applied to the same developing apparatus as in Example 28, no occurrence of stains of the developing apparatus was observed even after developing 3,000 plates. Also, the image quality of the offset printing master plate and the image quality of the 10,000th print were very clear.

EXAMPLE 49

In a paint shaker were placed 10 g of a dodecyl methacrylate/acrylic acid copolymer (95/5 by weight ratio), 10 g of nigrosine, and 30 g of Isopar H followed by dispersing to prepare a fine dispersion of nigrosine.

Then, a liquid developer was prepared by diluting 30 g of the resin dispersion D-64 obtained in Production Example 64 of latex grains, 2.5 g of the aforesaid nigrosine dispersion, 0.07 g of a copolymer of octadecene and semi-maleic octadecylamide, and 15 g of a higher alcohol, FOC-1600 (trade name, made by Nissan Chemical Industries, Ltd.) with one liter of Isopar G.

Comparison Liquid Developers A-3 and B-3

Two kinds of comparison liquid developers A-3 and B-3 were prepared in the same manner as described above using the following resin dispersions in place of the aforesaid resin dispersion.

Comparison Liquid Developer A-3

The resin dispersion obtained in Production Example 91 of latex grains was used.

Comparison Liquid Developer 92

The resin dispersion obtained in Production Example 92 of latex grains was used.

An electrophotographic light-sensitive material, ELP Master II Type (trade name, made by Fuji Photo Film Co., Ltd.) was image exposed and developed by a full-automatic processor, ELP 404V (trade name, made by Fuji Photo Film Co., Ltd.) using each of the liquid developers. The processing speed (plate-making speed) was 7 plates per minute. Furthermore, the occurrence of stains of the developing apparatus by sticking of the toner after processing 3,000 ELP Master II Type plates was evaluated. Also, the blackened ratio (imaged area) of the duplicated image was determined using 30% original.

The results obtained are shown in Table 15 below.

TABLE 15

| Test No. | Liquid Developer | Stains of Developing Apparatus | Image of the 3,000th Plate |
|---|---|---|---|
| 1 | Developer of invention | No stains | Clear |
| 2 | Comparison Developer A-3 | Toner residue greatly adhered. | Letters lost, solid black part hazed, background fogged. |
| 3 | Comparison Developer B-3 | Toner residue slightly adhered | Density of solid black part of imaged portion lowered, solid black part partially hazed. |

As is clear from the above results, when each of the liquid developers was used for making printing plates under the aforesaid severe plate-making condition of very fast plate-making speed, only the liquid developer according to the present invention could provide the 3,000th plate having clear images without staining the developing apparatus.

Then, the offset printing master plate (ELP master) prepared by processing using each of the liquid developers was used for printing in a conventional manner, and the number of prints obtained before occurrences of defects of the letters on the images of the print, the lowering of the density of the solid black portions of the images, etc., were observed. The results showed that the master plate obtained using each of the liquid developer of this invention and the comparison liquid developers A-3 and B-3 gave more than 10,000 prints without accompanied by the aforesaid failures.

As described above, the only liquid developer of this invention could advantageously be used for preparing a large number of printing master plates without staining the developing apparatus.

That is, in the cases of using the comparison liquid developers A-3 and B-3, there was no problem on the number of prints but the developing apparatus was too stained to be further used in succession.

Also, in the case of using the comparison liquid developer B-3, staining of the developing apparatus was greatly reduced as compared to the case of using the comparison liquid developer A-3, but the improvement was not yet satisfactory when the developing condition became severe.

That is, the known dispersion-stabilizing resin used for the comparison liquid developer B-3 has a feature that the resin is a random copolymer containing the monomer (A) (vinyl acetate in the examples) and a component having a polymerizable double bond group copolymerizing with the monomer (A), wherein the polymerizable double bond group exists in a portion near the polymer main chain, thereby the resin is considered to be inferior in the re-dispersibility of latex grains as compare with the dispersion-stabilizing resin of this invention.

EXAMPLE 50

A mixture of 100 g of the white resin dispersion obtained in Production Example 64 of latex grains and 1.5 g of Sumikalon Black was stirred for 4 hours at 100° C. After cooling to room temperature, the reaction mixture was passed through a 200 mesh nylon cloth to remove the remaining dye to obtain a black resin dispersion having a mean grain size of 0.25 μm.

Then, a liquid developer was prepared by diluting 30 g of the aforesaid black resin dispersion, 0.05 g of zirconium naphthanate, and 20 g of a higher alcohol, FOC-1600 (trade name, made by Nissan Chemical Industries, Ltd.) with one liter of Shellsol 71.

When the liquid developer was applied to the same developing apparatus as used in Example 49, no occurrence of stains of the developing apparatus by sticking of the toner was observed even after developing 3,000 plates.

Also, the image quality of the offset printing master plate obtained was clear and also the image quality of the 10,000th print was very clear.

EXAMPLE 51

A mixture of 100 g of the white resin dispersion obtained in Production Example 88 of latex grains and 3 g of Victoria Blue B was stirred for 6 hours at temperature of from 70° C. to 80° C. After cooling to room temperature, the reaction mixture was passed through a 200 mesh nylon cloth to remove the remaining dye to obtain a blue resin dispersion having a mean grain size of 0.25 μm was obtained.

Then, a liquid developer was prepared by diluting 32 g of the aforesaid blue resin dispersion, 0.05 g of zirconium naphthenate, and 15 g of a higher alcohol, FOC-1400 (trade name, made by Nissan chemical Industries, Ltd.) with one liter of Isopar H.

When the liquid developer was applied to the same developing apparatus as in Example 49, no occurrence of stains of the developing apparatus by sticking of the toner was observed even after developing 3,000 plates. Also, image quality of the offset printing master plate obtained was clear and also the image quality of the 10,000th print was very clear.

Furthermore, when the aforesaid processing was performed after allowing to stand the liquid developer for 3 months, the results were the same as above.

EXAMPLE 52

In a paint shaker were placed 10 g of poly(decyl methacrylate), 30 g of Isopar H, and 8 g of Alkali Blue together with glass beads followed by dispersing to prepare a fine dispersion of Alkali Blue.

Then, a liquid developer was prepared by diluting 30 g of the white resin dispersion obtained in Production Example 64 of latex grains, 4.2 g of the aforesaid Alkali Blue dispersion, 15 g of a higher alcohol, FOC-1400 (trade name, made by Nissan Chemical Industries, Ltd.), and 0.06 g of a semi-docasanylamidated compound of a copolymer of diisobutylene and maleic anhydride with one liter of Isopar G.

When the liquid developer was applied to the same developing apparatus as in Example 49, no occurrence of stains of the developing apparatus by sticking of the toner even after developing 3,000 plates. Also, the image quality of the offset printing master plate and image quality of the 10,000th print were very clear.

EXAMPLES 53 TO 69

Each of liquid developers was prepared by following the same procedure as Example 52 except that 6.0 g (as solid component) of each of the latex grains shown in Table 16 below was used in place of the white resin dispersion obtained in Production Example 64 of latex grains.

TABLE 16

| Example No. | Latex Grains | Stains of Developing Apparatus | Image of the 3,000th Plate |
|---|---|---|---|
| 53 | D-65 | No stains | Clear |
| 54 | D-66 | " | " |
| 55 | D-67 | " | " |
| 56 | D-68 | " | " |
| 57 | D-69 | " | " |
| 58 | D-70 | " | " |
| 59 | D-71 | " | " |
| 60 | D-72 | " | " |
| 61 | D-73 | " | " |
| 62 | D-74 | " | " |
| 63 | D-75 | " | " |
| 64 | D-76 | " | " |
| 65 | D-77 | " | " |
| 66 | D-78 | " | " |
| 67 | D-79 | " | " |
| 68 | D-80 | " | " |
| 69 | D-81 | " | " |

When each of the liquid developers was applied to the same developing apparatus as used in Example 49, no occurrence of stains of the developing apparatus by sticking of the toner was observed. Also, the image quality of the offset printing master plate obtained obtained and the image quality of the 10,000th print were very clear.

While the invention has been described in detail and with reference to specific embodiments thereof, it will be apparent to one skilled in the art that various changes and modifications can be made therein without departing from the spirit and scope thereof.

What is claimed is:

1. A liquid developer for electrostatic photography comprising resin grains dispersed in a non-aqueous solvent having an electric resistance of at least $10^9$ Ω cm and a dielectric constant of not higher than 3.5, wherein the dispersed resin grains are polymer resin grains obtained by polymerizing a solution containing at least one monofunctional monomer (A) which is soluble in the said non-aqueous solvent but becomes insoluble in said non-aqueous solvent by being polymerized, in the presence of a dispersion-stabilizing resin which is soluble in said non-aqueous solvent and is a comb-like copolymer having a polymer main chain, said comb-like copolymer formed from (1) at least a mono-functional macromonomer (M) having a weight average molecular weight of from $1 \times 10^3$ to $2 \times 10^4$ and (2) at least a monomer represented by the following formula (III), said monofunctional macromonomer (M) having (i) a polymer main chain containing at least one polymer component represented by the following formula (IIa) or (IIb) and (ii) a polymerizable double bond group represented by the following formula (I) bonded to only one terminal of the polymer main chain of the macromonomer (M);

$$\begin{matrix} a^1 & a^2 \\ | & | \\ CH = C \\ | \\ V- \end{matrix} \qquad (I)$$

wherein V represents —COO—, —OCO—, $CH_2{}_mOCO-$, $CH_2{}_mCOO-$, —O—, —CONHCOO—, —CONHCO, —SO$_2$—, —CO—, —CON—, —SO$_2$N—, or 
      |              |
      Z$^1$         Z$^1$ (wherein $Z^1$ represents a hydrogen atom or a hydrocarbon group and m represents an integer of from 1 to 3); $a^1$ and $a^2$, which may be the same or different, each represents a hydrogen atom, a halogen atom, a cyano group, a hydrocarbon group, —COO—$Z^2$, or —COO—$Z^2$ bonded via a hydrocarbon group (wherein $Z^2$ represents a hydrogen atom or a hydrocarbon group which may be substituted);

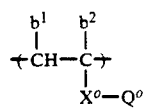 (IIa)

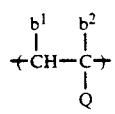 (IIb)

wherein $X^o$ has the same meaning as V in formula (I); $Q^o$ represents an aliphatic group having from b 1 to 22 carbon atoms or an aromatic group having from 6 to 12; Q represents —CN or

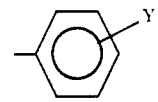

wherein Y represents a hydrogen atom, a halogen atom, an alkoxy group, or —COOZ$^3$ (wherein $Z^3$ represents an alkyl group, an aralkyl group, or an aryl group); and $b^1$ and $b^2$, which may be the same or different, have the same meanings as $a^1$ and $a^2$ in formula (I);

$$\begin{matrix} d^1 & d^2 \\ | & | \\ CH = C \\ | \\ X^1 - Q^1 \end{matrix} \qquad (III)$$

wherein $X^1$ has the same meaning as $X^o$ in formula (IIa); $Q^1$ has the same meaning as $Q^o$ in formula (IIa); and $d^1$ and $d^2$, which may be the same or different, have the same meanings as $a^1$ and $a^2$ in formula (I); with the proviso that, in the component of the macromonomer (M) represented by formula (IIa) and in the component of the monomer represented by formula (III), at least one of $Q^o$ and $Q^1$ represents an aliphatic group having form 10 to 22 carbon atoms, wherein the proportion of the mono-functional macromonomer (M) as a copolymer component of the comb-like copolymer is from 1% by weight to 70% by weight based on the weight of the copolymer; and wherein the content of the monomer shown by formula (III) is from 30% by weight to 99% by weight based on the weight of the copolymer.

2. The liquid developer for electrostatic photography as in claim 1, wherein the solution containing the monofunctional monomer (A) further contains a monomer (B-1) represented by formula (IV-1) which contains an aliphatic group having at least 8 carbon atoms and which is capable of forming a copolymer by copolymerization reaction with said mono-functional monomer (A);

$$\begin{matrix} e^1 & e^2 \\ | & | \\ CH = C \\ | \\ G - R^1 \end{matrix} \qquad (IV-1)$$

wherein $R^1$ represents an aliphatic group having at least 8 carbon atoms; G represents —COO—, —CONH—,

—CON—
    |
    R$^2$ (wherein $R^2$ represents an aliphatic group), —OCO—, —CH$_2$COO— or —O—, and $e^1$ and $e^2$, which may be the same or different, each represents a hydrogen atom, an alkyl group, —COOR$^3$, or —CH$_2$—COOR$^3$ (wherein $R^3$ represents an aliphatic group).

3. The liquid developer for electrostatic photography as in claim 2, wherein the proportion of monomer (B-1) is from 0.1 to 20% by weight based on the weight of monomer (A).

4. The liquid developer for electrostatic photography as in claim 1, wherein the solution containing the monofunctional monomer (A) further contains at least one kind of a monomer (B-2) represented by the following formula (IV-2) and having at least two polar groups and/or polar linkage groups;

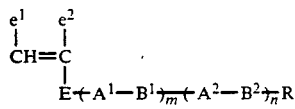 (IV-2)

wherein E represents —O—, —COO—, —OCO—, —CH$_2$OCO—, —SO$_2$—, —CONH, —SO$_2$NH—,

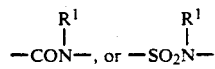

(wherein R$^1$ represents a hydrocarbon group or has the same significance as the linkage group, $-(A^1-B^1)_m-(A^2-B^2)_n-R$ in formula (IV-2)); R represents a hydrogen atom or a hydrocarbon group having from 1 to 18 carbon atoms, which may be substituted with a halogen atom, —OH, —CN, —NH$_2$, —COOH, —SO$_3$H, or —PO$_3$H$_2$; B$^1$ and B$^2$, which may be the same or different, each represents —O—, —S—, —CO—, —CO$_2$—, —OCO—, —SO$_2$—,

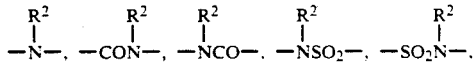

—NHCO$_2$, or NHCONH—(wherein R$^2$ has the same meaning as R described above); A$^1$ and A$^2$, which may be the same or different, each represents a hydrocarbon group having from 1 to 18 carbon atoms, which may be substituted or may have —CH—
|
$B^3-(A^4-B^4)_p-R^3$ (wherein B$^3$ and B$^4$, which may be the same or different, have the same meaning as B$^1$ and B$^3$ described above; A$^4$ represents a hydrocarbon group having from 1 to 18 carbon atoms, which may be substituted; and R$^3$ has the same meaning as R described above); e$^1$ and e$^2$, which may be the same or different, each represents a hydrogen atom, a hydrocarbon group —COO—R$^4$, or —COO—R$^4$ via a hydrocarbon (wherein R$^4$ represents a hydrogen atom or a hydrocarbon group which may be substituted); and m, n, and p, which may be the same or different, each represents an integer of from 0 to 4 with the proviso that m, n, and p cannot be 0 at the same time.

5. The liquid developer for electrostatic photography as in claim 4, wherein the proportion of monomer (B-2) is from 0.1 to 10% by weight based on the weight of monomer (A).

6. The liquid developer for electrostatic photography as in claim 1, wherein the dispersion-stabilizing resin is a comb-like copolymer having a weight average molecular weight of from 2×10$^4$ to 2×10$^5$ and having a polar group selected from the group consisting of —PO$_3$H$_2$, —SO$_3$H, —COOH, —OH, —SH,

(wherein Z° represents —Z$^{10}$ or —OZ$^{10}$ (wherein Z$^{10}$ represents a hydrocarbon group)), a formyl group, and an amino group bonded to only one terminal of the polymer main chain of the copolymer.

7. The liquid developer for electrostatic photography as in claim 1, wherein the liquid developer further comprises a coloring agent.

* * * * *